United States Patent
Takahashi et al.

(10) Patent No.: US 11,037,326 B2
(45) Date of Patent: Jun. 15, 2021

(54) INDIVIDUAL IDENTIFYING DEVICE

(71) Applicant: NEC Corporation, Tokyo (JP)

(72) Inventors: Toru Takahashi, Tokyo (JP); Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 74 days.

(21) Appl. No.: 16/347,740

(22) PCT Filed: Nov. 30, 2016

(86) PCT No.: PCT/JP2016/085541
§ 371 (c)(1),
(2) Date: May 6, 2019

(87) PCT Pub. No.: WO2018/100669
PCT Pub. Date: Jun. 7, 2018

(65) Prior Publication Data
US 2019/0287266 A1 Sep. 19, 2019

(51) Int. Cl.
G06T 7/00 (2017.01)
G06T 7/73 (2017.01)
G06K 9/52 (2006.01)
G06K 19/06 (2006.01)

(52) U.S. Cl.
CPC ............... *G06T 7/74* (2017.01); *G06K 9/522* (2013.01); *G06K 19/06028* (2013.01); *G06K 19/06037* (2013.01); *G06T 7/00* (2013.01)

(58) Field of Classification Search
CPC . G06T 7/74; G06T 7/00; G06K 9/522; G06K 19/06028; G06K 19/06037

USPC ...... 382/103, 232, 239; 375/E7.001, E7.132, 375/E7.026, E7.126, E7.144; 707/705, 707/736
See application file for complete search history.

(56) References Cited

U.S. PATENT DOCUMENTS

| | | | | |
|---|---|---|---|---|
| 6,803,919 | B1 * | 10/2004 | Kim | G06K 9/522 345/582 |
| 8,896,731 | B2 * | 11/2014 | Kanemitsu | H04N 9/045 348/273 |
| 10,488,840 | B2 * | 11/2019 | Sakakibara | G05B 19/41875 |
| 2004/0218815 | A1 | 11/2004 | Iizuka | |

FOREIGN PATENT DOCUMENTS

| | | |
|---|---|---|
| JP | 3235075 B2 | 12/2001 |
| JP | 2004-240931 A | 8/2004 |
| JP | 2005-190346 A | 7/2005 |
| JP | 2007-534067 A | 11/2007 |

(Continued)

OTHER PUBLICATIONS

Office Action dated May 20, 2020 in Japanese Application No. 2018-553570.

(Continued)

*Primary Examiner* — Sheela C Chawan
(74) *Attorney, Agent, or Firm* — Sughrue Mion, PLLC

(57) ABSTRACT

An individual identifying device includes a conversion unit and an alignment unit. The conversion unit performs frequency conversion on an image obtained by imaging an object. The alignment unit performs alignment of an image for extracting a feature amount for identifying an individual of the object, based on a first subregion in the image after the frequency conversion.

16 Claims, 24 Drawing Sheets

(56) References Cited

FOREIGN PATENT DOCUMENTS

| | | |
|---|---|---|
| JP | 4337422 B2 | 9/2009 |
| JP | 4664147 B2 | 4/2011 |
| JP | 2013-196418 A | 9/2013 |
| JP | 2014-142881 A | 8/2014 |
| JP | 2014-228940 A | 12/2014 |
| WO | 2014/163014 A1 | 10/2014 |

OTHER PUBLICATIONS

International Search Report of PCT/JP2016/085541 dated Jan. 31, 2017.

* cited by examiner

INDIVIDUAL IDENTIFYING DEVICE

CROSS REFERENCE TO RELATED APPLICATIONS

This application is a National Stage of International Application No. PCT/JP2016/085541 filed Nov. 30, 2016.

TECHNICAL FIELD

The present invention relates to an individual identifying device, an individual identifying method, and a program.

BACKGROUND ART

Conventionally, with respect to objects such as industrial products and goods, quality and distribution of respective products are managed by giving serial numbers, bar codes, or QR codes. There is also a technology of efficiently realizing comprehensive product management from production to distribution and sales of products, and loss prevention, theft prevention, and forgery prevention for products, through a wireless communication system by giving IC tags or RFID tags to respective products.

However, in an individual management method of products using the serial numbers, bar codes, QR codes, IC tags, or RFID tags, it is necessary to impart them to respective products. Therefore, there is a problem that the cost becomes enormous in proportion to the production quantity of the products.

Further, depending on the products such as physically small metal parts and resin parts such as screws and bolts, for example, there are many cases where serial numbers or bar codes cannot be written directly or tags cannot be mounted thereon. Moreover, even in the case of products in which bar codes can be physically written or tags can be imparted, there is a problem that imparting them impairs the appearance or design of the products.

In view of the above, another method has been proposed. In such a method, identification and management of respective products are performed by acquiring a spontaneous small difference arising in the same manufacturing process such as fine unevenness and a pattern on the product surface, or a random pattern or the like on the material surface, with use of an imaging device such as a camera, and recognizing the captured image.

For example, Patent Document 1 describes a goods management device in which a protective film is attached to a specific portion of a product surface, and a random pattern on the product surface in the protective film attached portion is acquired as an image by using an imaging device, and the captured image is used.

Patent Document 2 describes a product identifying means in which satin finish formed on a component or a product surface is captured by a camera, and the image feature of the satin pattern included in the captured image is used.

Patent Documents 3 and 4 describe a method of performing authenticity determination of goods by using a random pattern of taggant (fine particles) on goods, for the purpose of individual identification or goods authenticity determination.

Further, as a similar technology, there is a biometric authentication technology for performing personal authentication using patterns such as human fingerprints, iris, or palm print. Usually, a feature amount is designed according to an imaging object such as a fingerprint or iris, and similarity between the feature amounts is calculated, to thereby perform identification or authentication of an individual (person). However, there is also a method of performing identification or authentication of an individual (person) by using a general-purpose image matching technique. For example, Patent Document 5 proposes a method in which two-dimensional Fourier transform is performed on a captured image of a human fingerprint, and with use of a phase-only correlation of the captured image, identification and authentication of an individual (person) is performed. Further. Patent Document 6 proposes a method of performing identification and authentication of an individual (personal) by using phase-only correlation with respect to a captured image of iris.

Patent Document 7 describes an image conversion device in which, for the purpose of personal authentication, an image of a subject is applied with frequency conversion and polar coordinate conversion, and from a frequency spectrum image represented by the polar coordinate system, a frequency band representing the feature of the subject is selected, and a vector for an individual identification including the elements specifying the selected frequency band and the elements representing the frequency spectrum is generated. Additionally, in Patent Document 7, positional displacement, caused by the fact that the direction of the subject varies each time the biological information is read, is handled at the time of collation, by calculating the total sum of the distance between the direction of the input feature information vector and the direction of the registered feature information vector, while changing the combination of the two vectors.

Patent Document 8 describes an image collation device in which collation can be made even if there are differences in the amount of parallel movement, rotational angle, and expansion/contraction between a collation image and a registered image. In more detail, in Patent Document 8, firstly, a collation image and a registered image are applied with Fourier transform and log-polar conversion, and by the phase-only correlation between the frequency spectrum images of the collation image and the registered image obtained therefrom, correction information (magnification information, rotation information) of the collation image with respect to the registered image is generated. Then, the collation image is corrected by the correction information, and collation is performed by correlation processing between the corrected collation image and the registered image.

Patent Document 1: JP 4337422 B
Patent Document 2: WO2014/163014 A
Patent Document 3: JP 2007-534067 A
Patent Document 4: JP 2013-196418 A
Patent Document 5: JP 3235075 B
Patent Document 6: JP 4664147 B
Patent Document 7: JP 2014-142881 A
Patent Document 8: JP 2004-240931 A

SUMMARY

In Patent Document 7, the feature amount of the subject is extracted from frequency spectrum images after the image of the subject is applied with frequency conversion and polar conversion. However, In Patent Document 7, image alignment is not performed at the time of extracting the feature amount. Therefore, in Patent Document 7, the amount of processing at the time of collation increases. That is, in Patent Document 7, a positional displacement caused by the fact that the direction of the subject varies each time the biological information is read must be handled at the time of collation, by calculating the total sum of the distance between the direction of the input feature information vector and the direction of the registered feature information vector, while changing the combination of the two vectors. Therefore, it is conceivable to apply the image alignment technique described in Patent Document 8 to the technique described in Patent Document 7.

However, in Patent Document 8, correction information (magnification information, rotation information) of a first image with respect to a second image is generated by the phase-only correlation between the frequency spectrum image of the first image and the frequency spectrum image of the second image. Therefore, even if there is a common subregion to be used for alignment in the first image and the second image, there is a problem that it is difficult to obtain correction information with which alignment can be performed accurately, due to the influence of a region other than the common subregion.

An exemplary object of the present invention is to provide an individual identifying device that solves the aforementioned problems.

An individual identifying device according to an exemplary aspect of the present invention includes a conversion unit that performs frequency conversion on an image obtained by imaging an object, and an alignment unit that performs alignment of an image for extracting a feature amount for identifying an individual of the object, based on a first subregion in an image after the frequency conversion.

An individual identifying method according to another exemplary aspect of the present invention includes performing frequency conversion on an image obtained by imaging an object, and based on a first subregion in an image after the frequency conversion, performing alignment of the image for extracting a feature amount for identifying an individual of the object.

A program according to another exemplary aspect of the present invention causes a computer to function as a conversion unit that performs frequency conversion on an image obtained by imaging an object, and an alignment unit that performs alignment of an image for extracting a feature amount for identifying an individual of the object, based on a first subregion in an image after the frequency conversion.

As the present invention has the configuration described above, it is possible to accurately align an image obtained by imaging an object.

EXEMPLARY EMBODIMENTS

First Exemplary Embodiment

Figure 1:
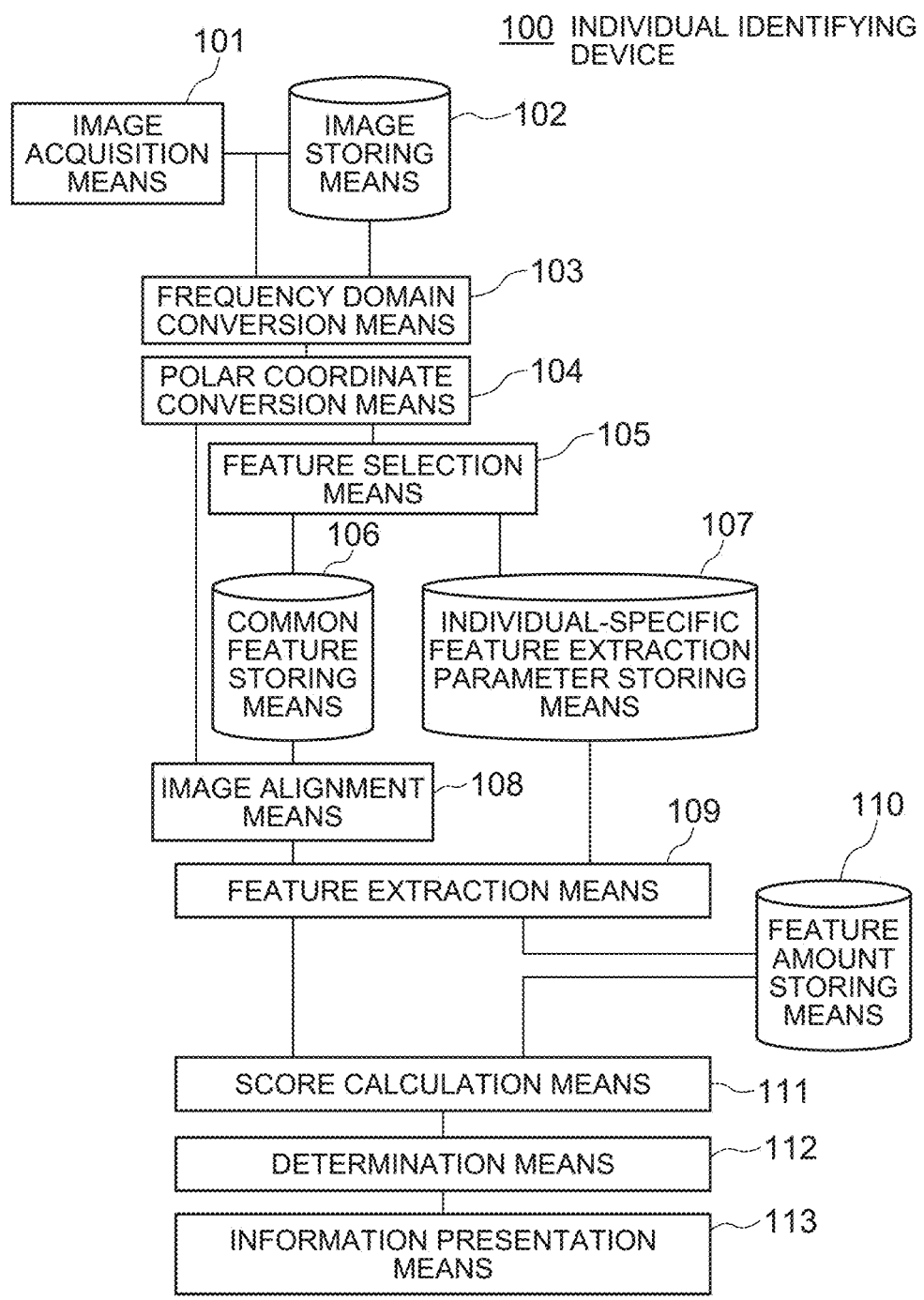
FIG. 1 is a block diagram of an individual identifying device according to a first exemplary embodiment of the present invention.

The present invention utilizes the fact that on the surfaces of products manufactured through the same manufacturing process, there are a fine pattern unique to each product and a fine pattern common to the products. Further, the present embodiment utilizes that fact that a fine pattern unique to each product and a fine pattern common to the products have different spatial frequencies. Hereinafter, the present embodiment will be described by item.

Object to be Solved by the Present Embodiment

In the methods described in the Documents mentioned above, in realizing individual management of parts and products that are mass-produced in production lines, there is a problem practically as described below.

When registering individual parts and products on a production line, it is necessary to have a method of imaging the same position on the surfaces of the individual parts and products automatically and reproducibly, without deteriorating the tact time of the manufacturing process. Usually, for appearance inspection of products, this is achieved by installing a camera or lighting equipment on the production line of parts. However, in order to image a fine individual difference involved in the products of the same manufacturing process, it is necessary to enlarge a small portion on the surface by a zoom lens or the like. However, when enlargement is performed, an error in positioning of the components at the time of imaging becomes a large positional deviation on the captured image. Therefore, in the production line, it is necessary to deliver parts below the camera very accurately. It is difficult to satisfy this requirement in the existing production line. Therefore, it is necessary to introduce a delivery system in which positioning can be performed with high accuracy. Also, the cost for introducing the apparatus increases.

Meanwhile, Patent Documents 1 and 2 describe a system in which an imaging mechanism is pressed to the object surface to image the same portion. However, in order to introduce this system on the production line, it is necessary to have a mechanism to move each product and the imaging mechanism precisely. Introduction of this mechanism usually leads to a large-scale apparatus. Further, in order to incorporate this mechanism in the existing production line, it is necessary to largely change the design of the production line itself. As a result, it may lead to a significant cost increase.

In addition, there is a system in which alignment is performed on an image captured in a wide area (wide angle) so as to include a positioning error range of parts or products at the time of capturing, and an individual-specific feature is extracted from the same portion on the surfaces of the parts or products.

For example, Patent Documents 1, 2, and 3 describe a system in which fluctuation in the position of a target object at the time of imaging is considered, and alignment of a captured image is performed using a mark, a logo or the like contained in the captured image. However, in this system, in the parts or products that are targets of individual management, it is necessary to have marks or logos commonly present in all individuals. The system cannot be applied to parts or products not having them. In particular, in the parts for industrial use, there are many parts hot having marks or logos, which causes a problem. In the manufacturing process, it may be dealt with by applying a mark or the like for positioning on the surface. However, such a method results in an increase of the manufacturing process, which may lead to deterioration in the tact time and deterioration in the production efficiency.

In addition, it is also possible to have a system of extracting a feature amount from the entire image including a positional displacement error range of a part, and performing individual identification and authentication of each part or product by using the feature amount.

For example, Patent Document 4 describes a system of extracting feature points from distribution of taggant, and performing collation using the feature amount based on the positional relationship. However, this system is based on the premise that the taggant serving as the reference is detectable. When wide-angle imaging is performed on the surfaces of parts or products so as to include a positional displacement error, there is a possibility that another taggant or a feature unique to the individual becomes noise so that a reproducible feature amount cannot be extracted. Further, there is a problem that this system is only applicable to parts and products having taggant particles attached to the surfaces, in the first place.

As a similar technology, there is a biometric authentication technology for performing personal authentication using patterns such as human fingerprints, iris, or palm print. Usually, a feature amount is designed according to an imaging object such as a fingerprint or iris, and similarity between the feature amounts is calculated, to thereby perform identification or authentication of an individual (person). However, there is also a method of performing identification or authentication of an individual (person) by using a general-purpose image matching technique. For example, Patent Document 5 proposes a method in which two-dimensional Fourier transform is performed on a captured image of a human fingerprint, and with use of a phase-only correlation of the captured image, identification and authentication of an individual (person) is performed. Patent Document 6 proposes a method of performing identification and authentication of an individual (personal) by using phase-only correlation with respect to a captured image of iris. Patent Document 7 proposes a system in which at the time of collation, the total sum of a distance between a direction of an input feature information vector and a direction of a registered feature information vector is calculated, while changing the combination of the two vectors. Patent Document 8 proposes a system in which at the time of collation of a collation image, correction for alignment of the collation image is performed, and collation is performed by the correlation processing between the corrected collation image and the registered image.

It is conceivable to realize individual identification and individual authentication by matching of captured images of a random pattern on the product surface, by using a general-purpose image matching method illustrated above. However, in the case of utilizing the techniques described above, it is necessary to perform two-dimensional Fourier transform on the respective images to be compared in each identification or collation process. Accordingly, there is a problem that the computation amount is large. In particular, in order to realize individual management of all parts and products to be mass-produced, the identification or collation process is performed the number of times proportional to the number of registration. Therefore, in order to obtain an identification and collation result at a rate capable of withstanding practical use, a large amount of computational resources are required, which causes a problem of cost increase relating to device deployment.

Further, it is also conceivable to use a system in which the computation amount at the time of identification and collation process is reduced by, instead of storing the images, storing resultant data of two-dimensional Fourier transform performed on the images. However, in the case of imaging a wide area in consideration of a positioning error of a part, the captured image has a large data size, whereby the data size after the Fourier transform is also large. When performing individual management on all parts or products that are mass-produced, the storage capacity required for storing the entire registered data is enormous. Accordingly, there is a problem that the cost associated with an increase of the storage capacity increases.

Furthermore, as described in Patent Document 8, in the alignment of a system in which correction information (magnification information, rotation information) for a first image with respect to a second image is generated by the phase-only correlation between a frequency spectrum image of the first image and a frequency spectrum image of the second image, the region other than a common subregion to be used for alignment becomes noise. This causes a problem that accurate alignment cannot be performed.

The present embodiment has been made in view of the above problems. The present invention provides an individual identification and authentication system suitable for realizing individual management of parts and products that are mass-produced in a production line.

Configuration of Present Embodiment

FIG. 1 is a block diagram of an individual identifying device according to the present embodiment. An individual identifying device 100 according to the present embodiment includes an image acquisition means 101, an image storing means 102, a frequency domain conversion means 103, a polar coordinate conversion means 104, a feature selection means 105, a common feature storing means 106, an individual-specific feature extraction parameter storing means 107, an image alignment means 108, a feature extraction means 109, a feature amount storing means 110, a score calculation means 111, a determination means 112, and an information presentation means 113. The feature selection means 105 is also referred to as a reference image determination unit or a second subregion determination unit. The score calculation means 111 and the determination means 112 are also referred to as a collation unit.

The image acquisition means 101 has a function of acquiring an image of a surface of a product to be managed. The image storing means 102 has a function of storing an image obtained by the image acquisition means 101. The frequency domain conversion means 103 has a function of performing frequency conversion on an image to convert it to a frequency spectrum image. As frequency conversion, two-dimensional discrete Fourier transform is used. However, another type of frequency conversion such as two-dimensional discrete wavelet transform may be used. The polar coordinate conversion means 104 has a function of converting a frequency spectrum image into polar coordinates. The feature selection means 105 has a function of obtaining a frequency feature appearing in common to images on the surfaces of a plurality of products (common feature), and a parameter including a frequency band in which a frequency feature, appearing in an image of a surface of a product unique to the product, appears (individual-specific feature extraction parameter), based on the frequency spectrum image convened into polar coordinates. The common feature storing means 106 has a function of storing a common feature output from the feature selection means 105. The individual-specific feature extraction parameter storing means 107 has a function of storing an individual-specific feature extraction parameter output from the feature selection means 105.

The image alignment means 108 has a function of performing alignment of a frequency spectrum image after polar coordinate conversion, corresponding to a captured image of a surface of a product to be managed, with respect to a common feature stored in the common feature storing means 106. The feature extraction means 109 has a function of calculating an individual-specific feature amount from a frequency spectral image after the alignment, with use of a parameter stored in the individual-specific feature extraction parameter storing means 107. The feature amount storing means 110 has a function of storing an individual-specific feature amount obtained by the feature extraction means 109 from a captured image. The score calculation means 111 has a function of comparing an individual-specific feature amount obtained by the feature extraction means 109 from a captured image that is a query image, with a feature amount stored in the feature amount storing means 110, and calculates the similarity between the feature amounts as a score (numerical value). The determination means 111 has a function of outputting a determination result of identification and collation, based on the score obtained by the score calculation means 110. The information presenting means 113 has a function of presenting individual management information based on a determination result.

Figure 2:
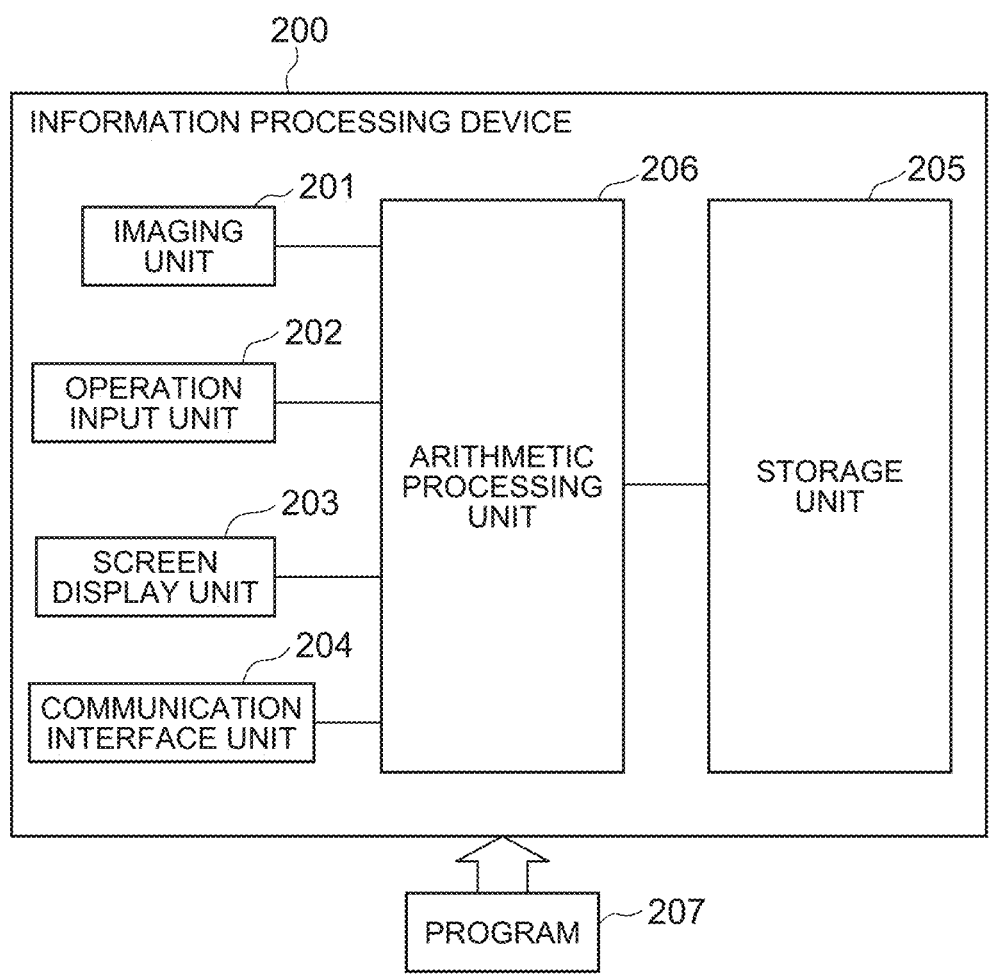
FIG. 2 is a block diagram illustrating an exemplary hardware configuration of the individual identifying device according to the first exemplary embodiment of the present invention.

As illustrated in FIG. 2, for example, the individual identifying device 100 can be implemented by an information processing device 200 such as a personal computer or a smart phone including an imaging unit 201 such as a camera, an operation input unit 202 such as a keyboard and a mouse, a screen display unit 203 such as a liquid crystal display, a communication interface unit 204, a storage unit 205 such as a memory and a hard disk, and at least one arithmetic processing unit 206 such as a microprocessor, and a program 207.

The program 207 is read from an external computer-readable storage medium into the memory when the information processing device 200 is started to control operation of the arithmetic processing unit 206, to thereby implement, on the arithmetic processing means 206, functional means such as the image acquiring means 101, the image storing means 102, the frequency domain conversion means 103, the polar coordinate conversion means 104, the feature selection means 105, the common feature storing means 106, the individual-specific feature extraction parameter storing means 107, the image alignment means 108, the feature extraction means 109, the feature amount storing means 110, the score calculation means 111, the determination means 112, and the information presentation means 113.

Next, operation of the individual identifying device 100 according to the present embodiment will be described with reference to the drawings. Operation of the individual identifying device 100 is roughly divided into the three operations described below.

(a) Operation of pre-processing to extract common feature and determine individual-specific feature extraction parameter
(b) Operation of individual registration
(c) Operation of individual identification and individual collation

[Pre-Processing: Common Feature Extraction and Individual-Specific Feature Extraction Parameter Determination Process]

First, as pre-processing, operation of common feature extraction and individual-specific feature extraction parameter determination process will be described.

Figure 3:
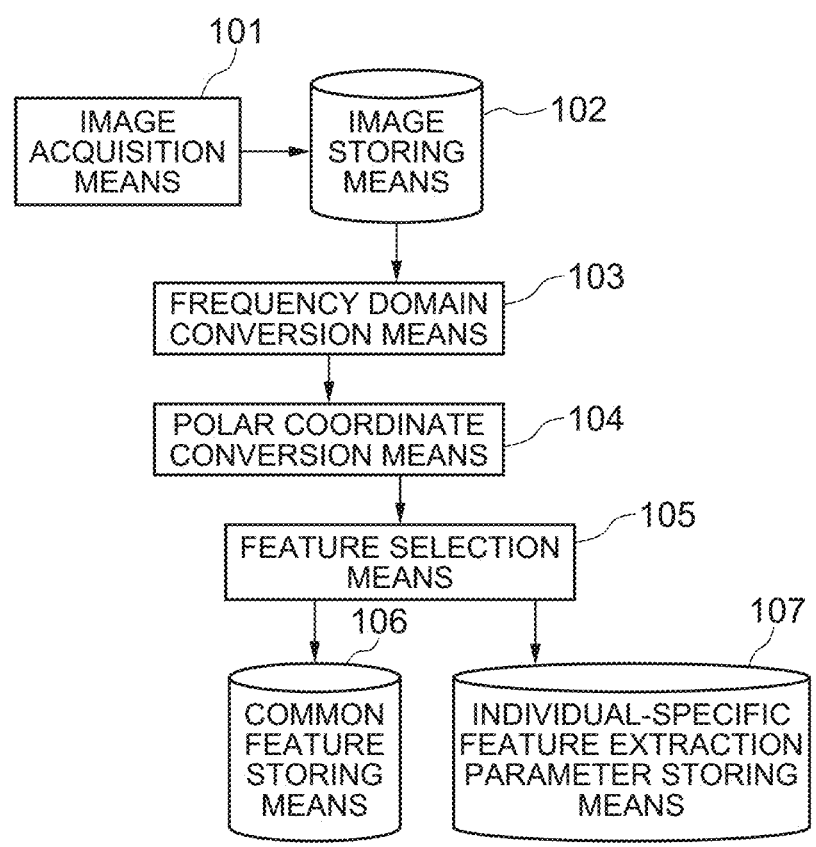
FIG. 3 is an operational flow diagram of parameter determination for common feature extraction and individual-specific feature extraction in the individual identifying device according to the first exemplary embodiment of the present invention.
Figure 4:
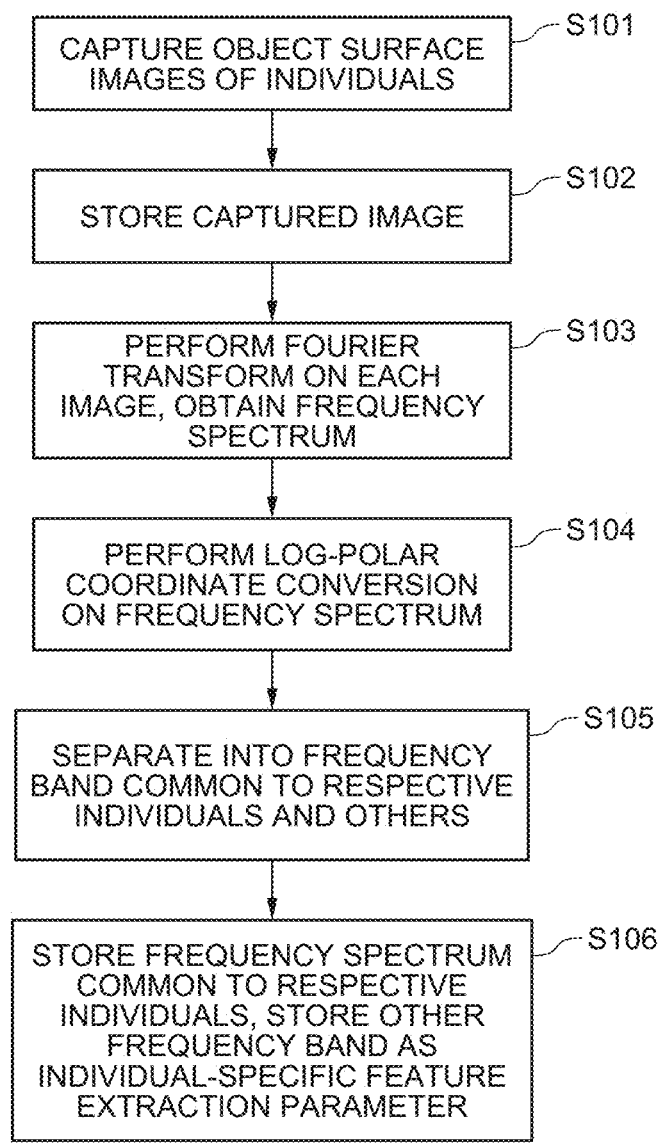
FIG. 4 is a flowchart showing an example of a parameter determination process for common feature extraction and individual-specific feature extraction in the individual identifying device according to the first exemplary embodiment of the present invention.

FIGS. 3 and 4 illustrate an operational flow and a flowchart of common feature extraction and individual-specific feature extraction parameter determination process.

<Acquisition and Storage of Image>

First, the image acquisition means 101 acquires respective images of surface patterns of a plurality of products to be managed, and stores them in the image storing means 102 (step S102). The image acquisition means 101 acquires at least one image for each individual, and stores it in the image storing means 102. Alternatively, in order to improve the accuracy of individual-specific feature extraction parameters, the image acquisition means 101 may acquire a plurality of images for each individual and store them in the image storing means 102. The image acquisition means 101 may be any of an imaging device such as a camera or a scanner, an image data acquisition device via a network, and an image data acquisition device via a storage medium such as a CD-ROM.

Moreover, in the case where there are a plurality of production lines for manufacturing products to be managed, the image acquisition means 101 stores the acquired images of the surface patterns of the products by the production line, in the image storing means 102. Here, a production line includes an assembly process with an assembly line, and a single assembly process with a single processing machine, provided for mass production of the same products and products of the same type.

For example, it is assumed that in a first production line, products are mass-produced by casting or forging using a die A1, and in a second production line, products are mass-produced by casting or forging using a mold A2 that is the same as the mold A1. In that case, the image acquisition means 101 distinguishes an image of a surface pattern of a product manufactured by the first line, from an image of a surface pattern of a product manufactured by the second production line, and stores them in the image storage unit 102. In that case, on the products manufactured by the first production line, a pattern unique to the mold A1 is transferred to the entire surface. In addition, on the products manufactured by the second production line, a pattern unique to the mold A2 is transferred to the entire surface.

Further, it is also assumed that in the first production line, products are mass-produced by cutting the material with use of a cutting device B1, and in the second production line, products are mass-produced by cutting the material with use of a cutting device B2 that is the same as the cutting device B1, for example. In that case, the image acquisition means 101 distinguishes an image of a surface pattern of a product manufactured by the first line, from an image of a surface pattern of a product manufactured by the second production line, and stores them in the image storage unit 102. In that case, in the products manufactured by the first production line, fine irregularities in surface roughness, that are unique to the cross-section of the blade used for cutting of the cutting device B1, appear on the cut surface. In addition, in the products manufactured by the second production line, fine irregularities in surface roughness, that are unique to the cross-section of the blade used for cutting of the cutting device B2, appear on the cut surface. The same machining methods and devices mentioned here are only examples. Other same machining methods and devices may also be handled similarly.

Figure 11A:
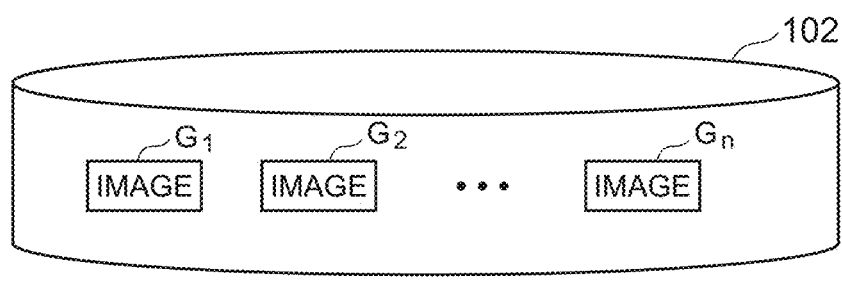
FIG. 11A is a diagram illustrating exemplary contents of an image storing means in the individual identifying device according to the first exemplary embodiment of the present invention.
Figure 11B:
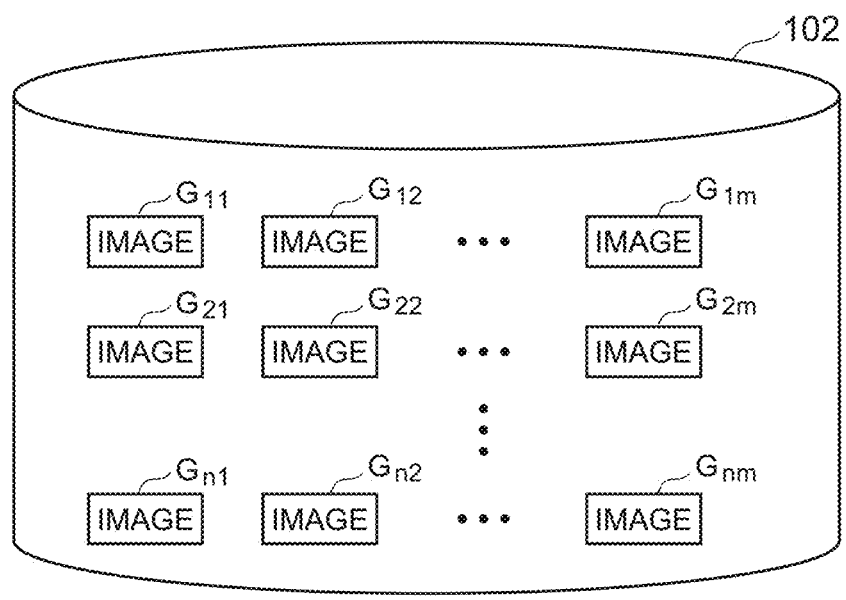
FIG. 11B is a diagram illustrating exemplary contents of an image storing means in the individual identifying device according to the first exemplary embodiment of the present invention.
Figure 11C:
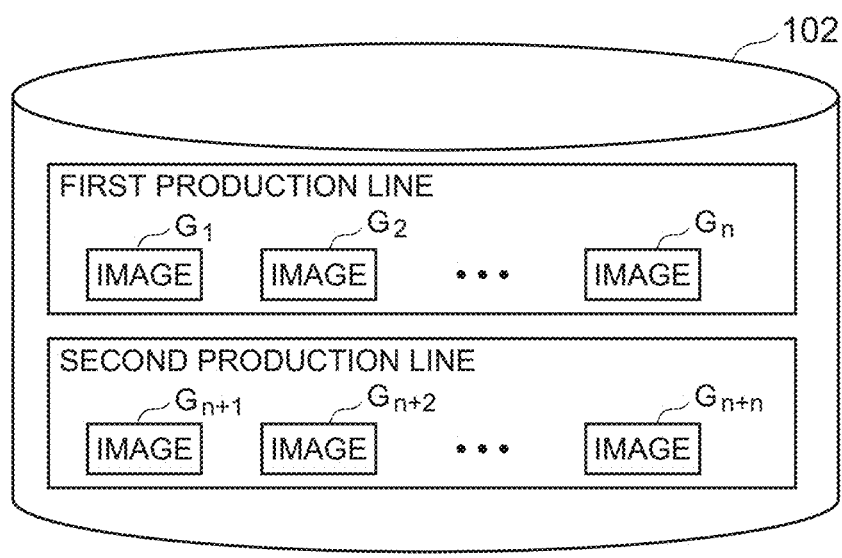
FIG. 11C is a diagram illustrating exemplary contents of an image storing means in the individual identifying device according to the first exemplary embodiment of the present invention.

FIGS. 11A to 11C illustrate exemplary contents of the image storing means 102. FIG. 11A illustrates an example that the image acquisition means 101 acquires one image for each individual, and stores it in the image storing means 102. Images $G_1, \ldots G_n$ are n pieces of images corresponding one-to-one to n pieces of products. Further, FIG. 11B illustrates an example that the image acquisition means 101 acquires m (m≥2) pieces of images for each individual, and stores in the image storage unit 102. Images $G_{11}, \ldots, G_{1m}$, images $G_{21}, \ldots, G_{2m}, \ldots$, images $G_{n1}, \ldots, G_{nm}$ are n×m pieces of images corresponding, one-to-one, to n pieces of products. FIG. 11C illustrates an example that the image acquisition means 101 stores images of products in the image storing means 102 by the production line. Images $G_1, \ldots G_n$ are n pieces of images corresponding one-to-one to n pieces of products produced in the first production line. Images $G_{n+1}, \ldots G_{n+n}$ are n pieces of images corresponding one-to-one to n pieces of products produced in the second production line. In the example of FIG. 11C, one image is stored for one individual. However, a plurality of images may be stored for one individual.

[Common Feature Extraction Process and Individual-Specific Feature Extraction Parameter Determination Process]

Next, the frequency domain conversion means 103 extracts, from the image storage unit 102, images of surface patterns of a plurality of products to be managed, and converts them into two-dimensional frequency spectrum data of the respective images (step S103). Further, at step S103, the frequency domain conversion means 103 may further take the logarithm of the two-dimensional frequency spectrum data obtained, and convert it into logarithmic amplitude spectrum data. Hereinafter, the two-dimensional frequency spectrum data obtained in this process is referred to as a frequency spectrum image.

Next, the polar coordinate conversion unit 104 converts the frequency spectrum image obtained by the frequency domain conversion means 103 into polar coordinates (step S104). In general, rotational movement in the real coordinate becomes lateral movement along the θ axis in the polar coordinate. Therefore, the rotational variation amount between two frequency spectrum images is represented by a parallel movement amount along the θ axis between the two frequency spectrum images after the polar coordinate conversion. At step S104, the polar coordinate conversion unit 104 may convert the frequency spectrum image obtained by the frequency domain conversion means 103 into log-polar coordinates. In general, the scale variation in the real coordinate becomes lateral movement along the log-r axis in the log polar coordinate. Therefore, the rotational variation amount and the scale variation between two frequency spectrum images are represented by a parallel movement amount along the θ axis and a parallel movement amount along the log-r axis between the two frequency spectrum images after the log-polar coordinate conversion. Therefore, conversion to the log polar coordinate is effective when there is scale variation in addition to the rotational variation between captured images at the time of image acquisition.

Figure 12A:
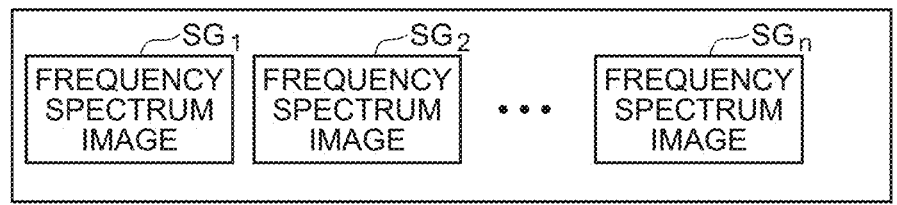
FIG. 12A is a diagram illustrating an example of a processing result of a frequency domain conversion means and a polar coordinate conversion means in the individual identifying device according to the first exemplary embodiment of the present invention.
Figure 12B:
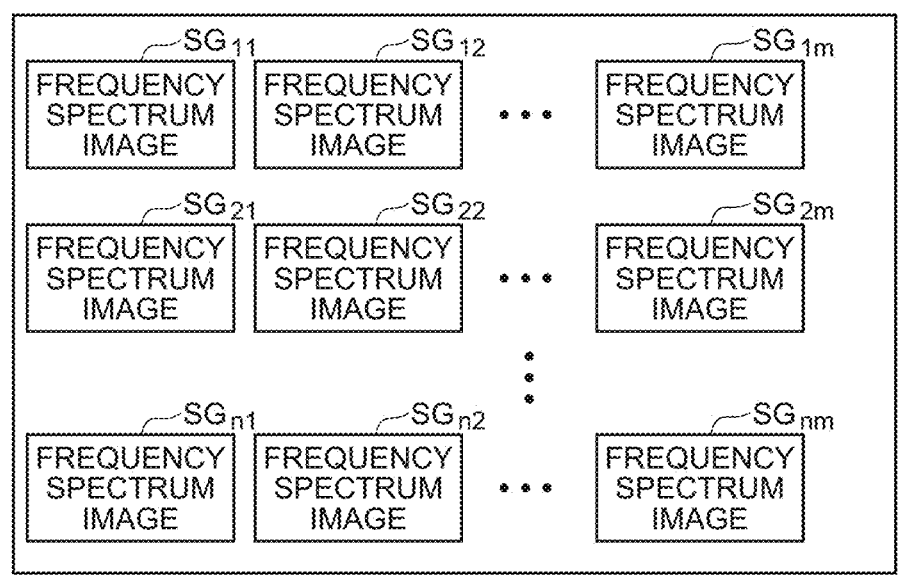
FIG. 12B is a diagram illustrating an example of a processing result of a frequency domain conversion means and a polar coordinate conversion means in the individual identifying device according to the first exemplary embodiment of the present invention.
Figure 12C:
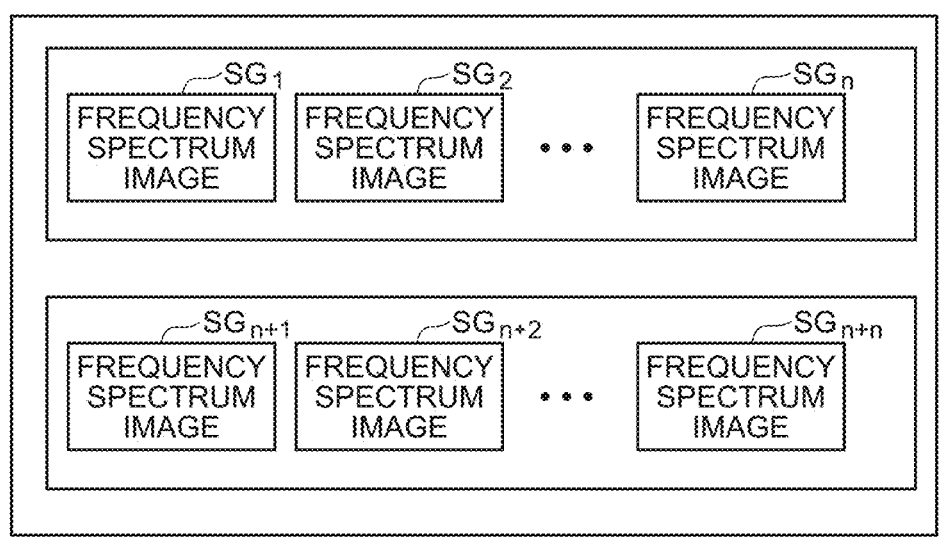
FIG. 12C is a diagram illustrating an example of a processing result of a frequency domain conversion means and a polar coordinate conversion means in the individual identifying device according to the first exemplary embodiment of the present invention.

FIGS. 12A to 12C illustrate examples of processing results by the frequency domain conversion means 103 and the polar coordinate conversion means 104. FIG. 12A illustrates a result of processing one image for each individual illustrated in FIG. 11A. Images $SG_1, \ldots, SG_n$, are n pieces of frequency spectrum images after polar coordinate conversion corresponding to the n pieces of products one-to-one. FIG. 12B illustrates a result of processing m (m≥2) images for each individual illustrated in FIG. 11B. Images $SG_{11}, \ldots, SG_{1m}$, images $SG_{21}, \ldots, SG_{2m}, \ldots$, images $SG_{n1}, \ldots, SG_{nm}$ are n×m pieces of frequency spectrum images after polar coordinate conversion corresponding one-to-one to the n pieces of products. Further, FIG. 12C illustrates a result of processing images by the production line as illustrated in FIG. 11C. Image $SG_1, \ldots, SG_n$ are n pieces of frequency spectrum images after polar coordinate conversion corresponding one-to-one to the n pieces of products produced in the first production line. Image $SG_{n+1}, \ldots, SG_{n+n}$ are n pieces of frequency spectrum images after polar coordinate conversion corresponding one-to-one to the n pieces of products produced in the second production line.

Figure 5:
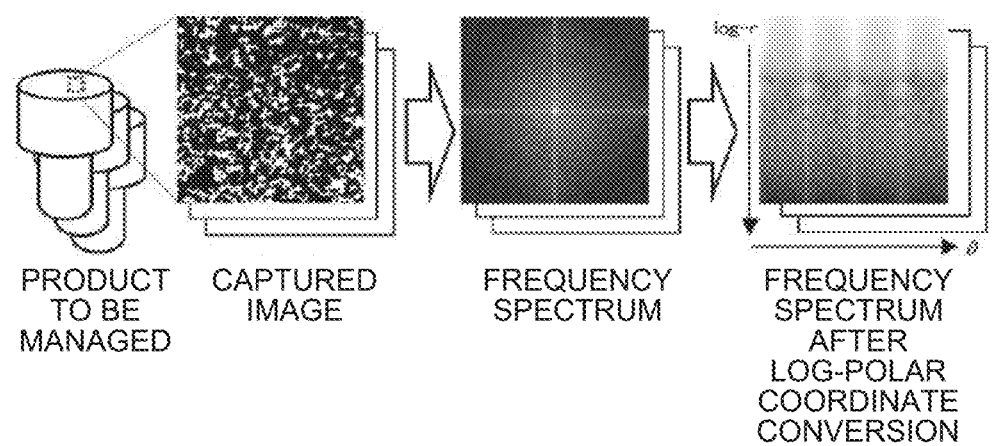
FIG. 5 illustrates examples of an image obtained by capturing a surface pattern of a product to be managed, a frequency spectrum image obtained by performing frequency conversion on the image, and a frequency spectrum image obtained by performing log-polar conversion on the frequency spectrum image.

FIG. 5 illustrates examples of an image obtained by capturing a surface pattern of a product to be managed, a frequency spectrum image obtained by performing frequency conversion on the image, and a frequency spectrum image obtained by performing log-polar conversion on the frequency spectrum image.

Next, the feature selection means 105 uses the frequency spectrum image after the polar coordinate conversion obtained by the polar conversion unit 104, to calculate a frequency spectral component common to the images of a plurality of products to be managed and an individual-specific feature extraction parameter (step S105). Hereinafter, description will be given separately.

<Calculation of Frequency Spectral Component Common to a Plurality of Products (Common Feature)>

For example, the feature selection means 105 extracts a specific part of a frequency band as a subregion image from the frequency spectrum images after the polar coordinate conversion of a plurality of products, and repeatedly obtains a normalized cross-correlation between all of the subregion images, to thereby calculate a common frequency spectrum component (common feature). In that case, instead of the normalized cross-correlation, the feature selection means 105 may apply a phase-only correlation method to all pairs from all subregion images to obtain S/N ratio of the correlation peak and its surrounding region, and obtain a subregion image having the highest S/N ratio as a common feature. The feature selection means 105 may perform distance calculation such as the Euclidean distance between the subregion images, and select a subregion having the shortest distance as a common feature. The feature selection means 105 may use a statistical method or machine learning with respect to the frequency spectrum images after polar coordinate conversion of a plurality of products to thereby obtain frequency spectrum common to all of the products (common feature).

Further, in the case where images of the surface patterns of the products are stored in the image storage unit means 102 by the production line, at step S105, the feature selection means 105 calculates, for each production line, a frequency spectrum component common to the images of the products manufactured in the production line (common feature). Therefore, from the frequency spectral images of a plurality of products that are manufactured using the mold A1, a common frequency spectral component (common feature) derived from the pattern transferred at the time of manufacturing by the mold A1 is calculated, and from the frequency spectrum images of a plurality of products that are manufactured using the mold A2, a common frequency spectral component (common feature) derived from the transferred pattern in the casting or forging with the mold A2 is calculated, for example. Meanwhile, from the frequency spectral images of a plurality of products manufactured by using the cutting device B1, a common frequency spectral component (common feature) derived from fine unevenness corresponding to the cross section of the cutting blade caused during cutting by the cutting device B1 is calculated, and from the frequency spectral images of a plurality of products produced by using the cutting device B2, a common frequency spectral component (common feature) derived from fine unevenness corresponding to the cross section of the cutting blade caused during cutting by the cutting device B2 is calculated, for example.

<Calculation of Individual-Specific Feature Extraction Parameter>

Figure 6:
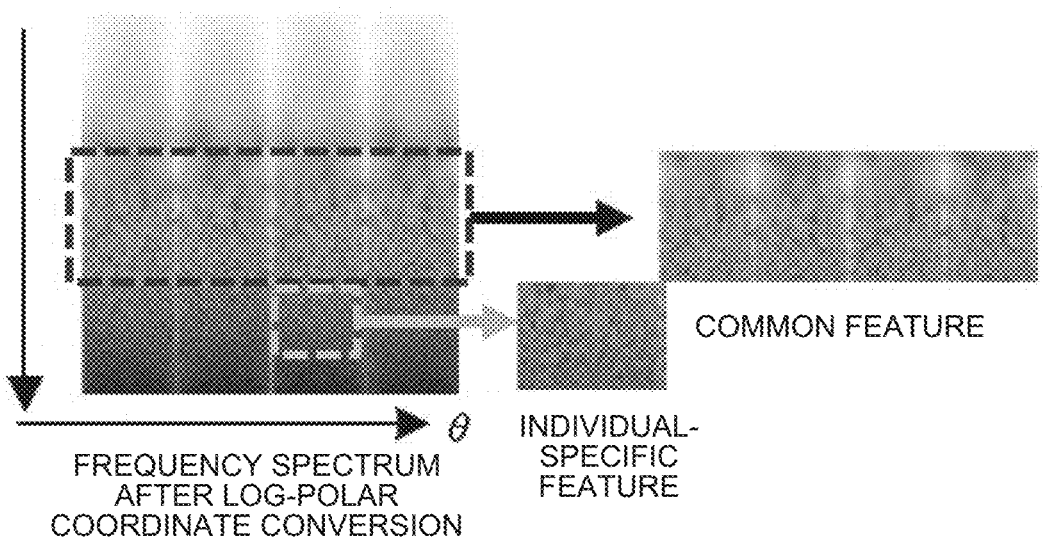
FIG. 6 is a diagram illustrating a relationship between a common feature and an individual-specific feature in a frequency spectrum after log-polar coordinate conversion.

The feature selection means 105 calculates a band other than the frequency spectrum calculated as the common feature in the frequency spectrum images after the polar coordinate conversion, as an individual-specific feature extraction parameter. For example, as illustrated in FIG. 6, when a part of the frequency spectrum after log-polar coordinate conversion is calculated as a frequency spectrum component (common feature) common to a plurality of components, the feature selection means 105 calculates a band other than the calculated frequency spectrum as an individual-specific feature extraction parameter. Preferably, the feature selection means 105 selects a band, on the band side higher than the common feature, as an individual-specific feature extraction parameter. Within the band determined by the individual-specific feature extraction parameter, an individual-specific feature exists. As described above, the frequency band of a common feature and the band determined by the individual-specific feature extraction parameter are different frequency bands. In addition, the frequency band of a common feature and the band determined by the individual-specific feature extraction parameter are bands that do not overlap with each other. In addition, the frequency band of a common feature is a band of lower frequency than the band determined by the individual-specific feature extraction parameter.

Further, in the case where images of the surface patterns of products are stored in the image storing means 102 by the production line, at step S105, the feature selection means 105 calculates, for each production line, a band other than the frequency spectrum component common to the products manufactured in the production line (common feature) (preferably, a band on the higher band side than the common feature) as an individual-specific feature extraction parameter.

In addition, when determining the frequency band for extracting the individual-specific feature, it is preferable that the feature selection means 105 uses a plurality of frequency spectrum images and images after the polar coordinate conversion of the same individual or different individuals to apply statistical methods such as main component analysis and linear discriminant analysis, or machine learning. Thereby, the feature selection means 105 is able to determine a frequency band in which noise is likely to be contained at the time of imaging and S/N ratio is poor as an individual-specific feature amount. Then, the feature selection means 105 reduces the determined frequency band of poor S/N ratio from the band other than the frequency spectrum calculated as a common feature (common feature) (preferably, a band on the higher frequency side than the common feature), to thereby determine a parameter in which only information usable for identification of each individual is extractable as a feature amount. Alternatively, the feature selection means 105 divides the band other than the frequency spectrum calculated as a common feature (preferably, a band on the higher frequency side than the common feature) into a plurality of frequency bands, and applies a weighting factor to each frequency band corresponding to the level of information amount contributing to individual identification based on the determined S/N ratio. The weighting factor is included in the individual-specific feature parameter, and can be used to improve the performance of individual identification and individual verification described below.

The feature selection means 105 stores the calculated frequency spectral component common to a plurality of products (common features) in the common feature storing means 106 (step S106). The common feature stored in the common feature storing means 106 is also referred to as a reference image. The feature selection means 105 also stores the calculated individual-specific feature extraction parameter in the individual-specific feature extraction parameter storing means 107 (step S106).

Figure 13A:
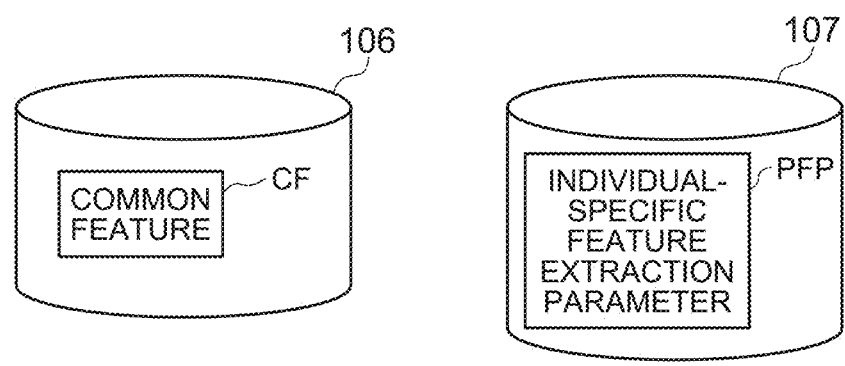
FIG. 13A is a diagram illustrating exemplary contents of a common feature storing means and an individual-specific feature extraction parameter storing means in the individual identifying device according to the first exemplary embodiment of the present invention.
Figure 13B:
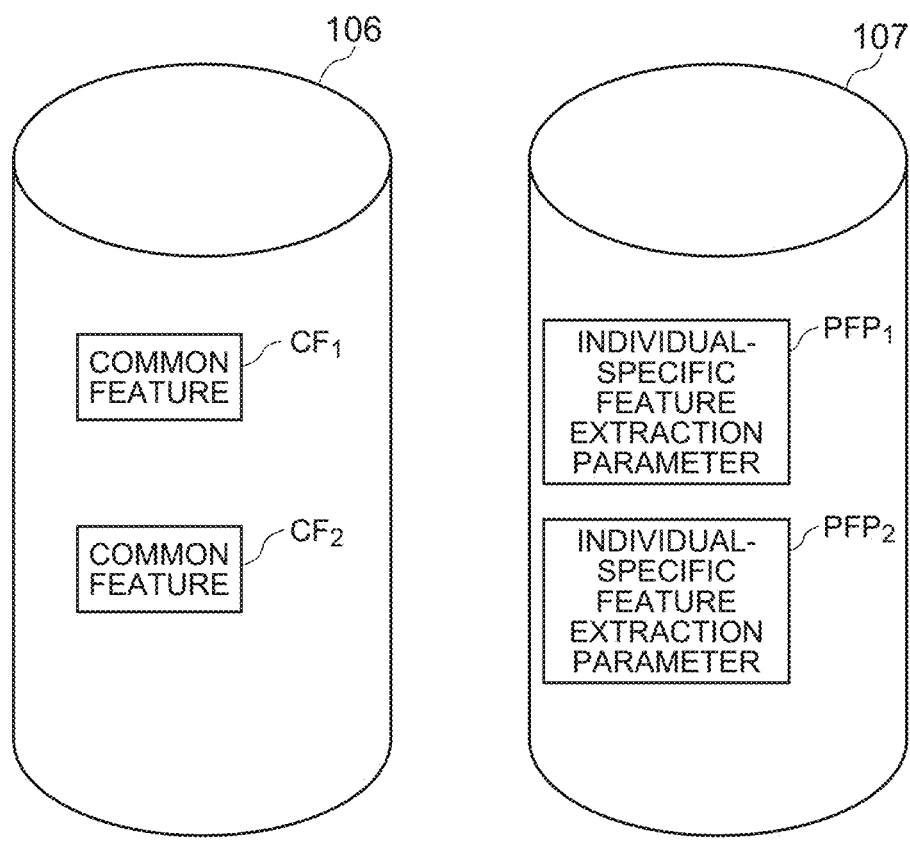
FIG. 13B is a diagram illustrating exemplary contents of a common feature storing means and an individual-specific feature extraction parameter storing means in the individual identifying device according to the first exemplary embodiment of the present invention.

FIGS. 13A and 13B illustrate exemplary contents of the common feature storing means 106 and the individual-specific feature extraction parameter storing means 107. FIG. 13A illustrates an example of storing a common feature CF and an individual-specific feature extraction parameters PFP obtained as a result of processing one or a plurality of images per individual illustrated in FIGS. 12A and 12B. Further, FIG. 13B illustrates an example of storage for each production line. In FIG. 13B, a common feature $CF_1$ and an individual-specific feature extraction parameter $PFP_1$ show a common feature and an individual-specific feature extraction parameter obtained as a result of processing an image of the first production line. Further, a common feature $CF_2$ and an individual-specific feature extraction parameter $PFP_2$ show a common feature and an individual-specific feature extraction parameter obtained as a result of processing an image of the second production line.

[Operation of Individual Registration]

Next, operation of individual registration for registering each object to be managed will be described.

Figure 7:
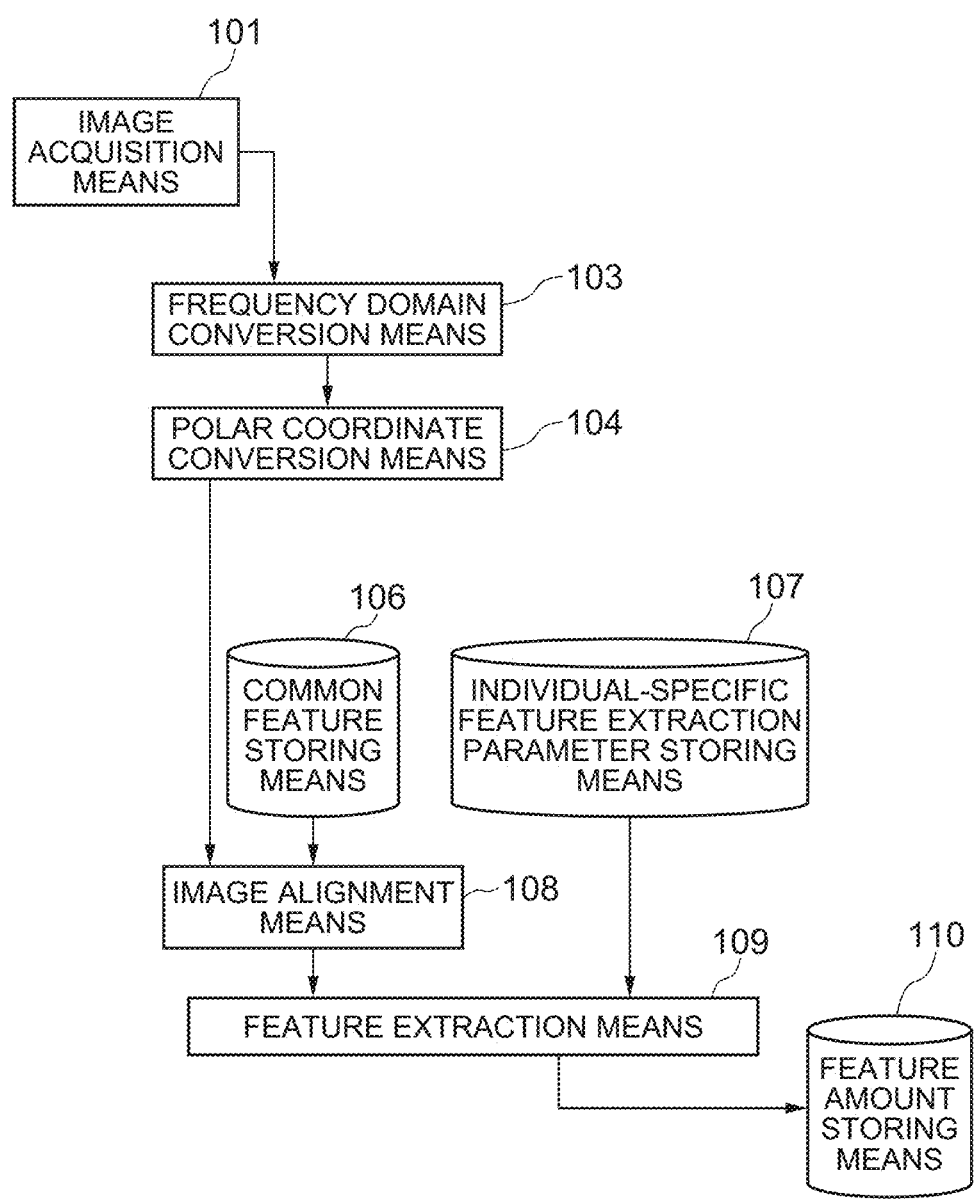
FIG. 7 is a process flow chart of an operation of individual registration in the individual identifying device according to the first exemplary embodiment of the present invention.
Figure 8:
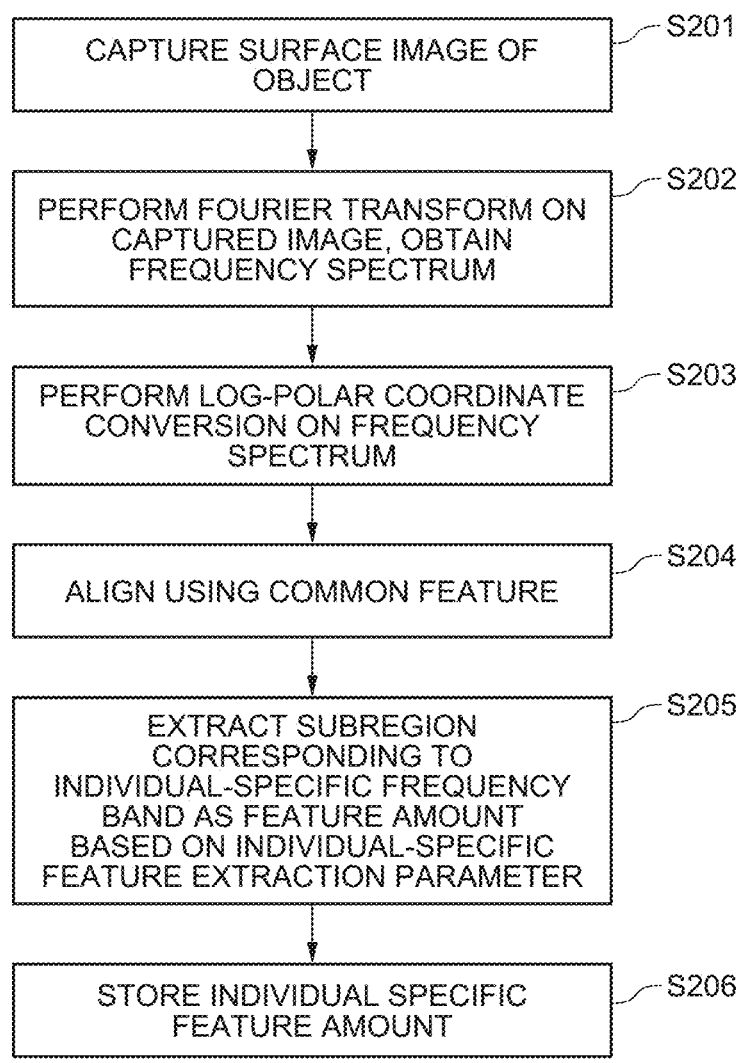
FIG. 8 is a flowchart illustrating an example of an individual registration process in the individual identifying device according to the first exemplary embodiment of the present invention.

FIGS. 7 and 8 are a process flow and a flowchart of the operation of individual registration. First, the image acquisition means 101 acquires an image obtained by imaging the surface of an object that is a target of individual registration (step S201). Next, the frequency domain conversion means 103 performs frequency conversion on the captured image acquired by the image acquisition means 101 to generate a frequency spectrum image (step S202). Next, the polar coordinate conversion means 104 performs log-polar coordinate conversion on the frequency spectrum image generated by the frequency domain conversion means 103 (step S203). These processes are the same as those performed in the pre-processing for common feature extraction and individual-specific feature extraction parameter determination.

Next, the image alignment means 108 receives the frequency spectrum image (after the polar coordinate conversion) of the captured image of the object that is a target of individual registration obtained by the polar coordinate conversion means 104, and the common feature stored in the common feature storing means 106 (frequency spectral component common to a plurality of products), and corrects the positional deviation amount of the frequency spectral image (after the polar coordinate conversion) with respect to the common feature (step S204). When a common feature for each production line is stored in the common feature storing means 106 as illustrated in FIG. 13B, the image alignment means 108 uses the common feature corresponding to the production line in which the product that is a target of individual registration is produced. For example, when the product that is a target of individual registration is produced in the first production line, the common feature $CF_1$ is used.

In the correction of positional deviation amount, first, the image alignment means 108 obtains a phase-only correlation between the frequency spectrum image (after the polar coordinate conversion) and the common feature, and calculates the positional deviation amount from the correlation peak position. Then, the image alignment means 108 corrects the frequency spectrum image (after the polar coordinate conversion) of the captured image of the object that is a target of individual registration, according to the calculated position displacement amount. Note that the image alignment process described above is only an example. It is needless to say that the process can be replaced with a general-purpose alignment process such as minimization of the sum of difference square between two images or alignment based on a normalized cross-correlation.

Next, the feature extraction means 109 receives the frequency spectral image after the alignment obtained by the image alignment processing unit 108, and the parameter stored in the individual-specific feature extraction parameter storing means 107. When an individual-specific feature extraction parameter for each production line is stored in the individual-specific feature extraction parameter storing means 107 as illustrated in FIG. 13B, the feature extraction means 109 uses the individual-specific feature extraction parameter corresponding to the production line in which the product that is a target of individual registration is produced. For example, when the product that is a target of individual registration is produced in the first production line, the individual-specific feature extraction parameter $PFP_1$ is used. Next, based on the frequency band information indicated by the input individual-specific feature extraction parameter, the feature extraction means 109 cuts out a partial image from the frequency spectral image after the alignment, and outputs the cut image as an individual-specific feature amount (step S205). In the case where the individual-specific feature extraction parameter includes a weighting factor for each frequency, the feature extraction means 109 multiplies each frequency component by the weighting factor, and then outputs the resultant as an individual-specific feature amount.

The individual-specific feature amount is not necessarily a real value of frequency spectrum, and may be a numerical sequence representing the real value of the frequency spectrum as binary data of 0 and 1. For example, the feature extraction means 109 cuts out the frequency band determined by the individual-specific feature extraction parameter as a partial image, from the frequency spectral image after the alignment. Next, the feature extraction means 109 selects a pixel pair at random from the partial image. Alternatively, the feature extraction means 109 selects a pixel pair at a predetermined position on the partial image. Next, the feature extraction means 109 compares the values of the selected pixel pair. Then, based on the comparison result, the feature extraction means 109 allocates values 0 and 1 depending on the magnitude relationship between the values of the pixel pair. Next, the feature extraction means 109 outputs a binary code obtained by allocating the values 0 and 1 in this manner, as an individual-specific feature amount. Further, the feature extraction means 109 may use a means for converting it to a binary feature amount represented by Binary Hashing to thereby output a binary code generated from a feature vector of other real values, as an individual-specific feature amount.

Next, the feature amount storing means 110 stores the feature amount specific to the individual that is a registration target obtained by the feature extraction means 109 (step S206). At this time, the feature amount storing means 110 registers the individual-specific feature amount by linking it with (in association with) information related to the product that is a registration target, such as individual ID number of the registration target, registration date, size, and product specification (also referred to as supplementary information). With this process, it is possible to present the individual management information of the product based on the determination result at the time of individual identification and individual authentication described below.

Figure 14:
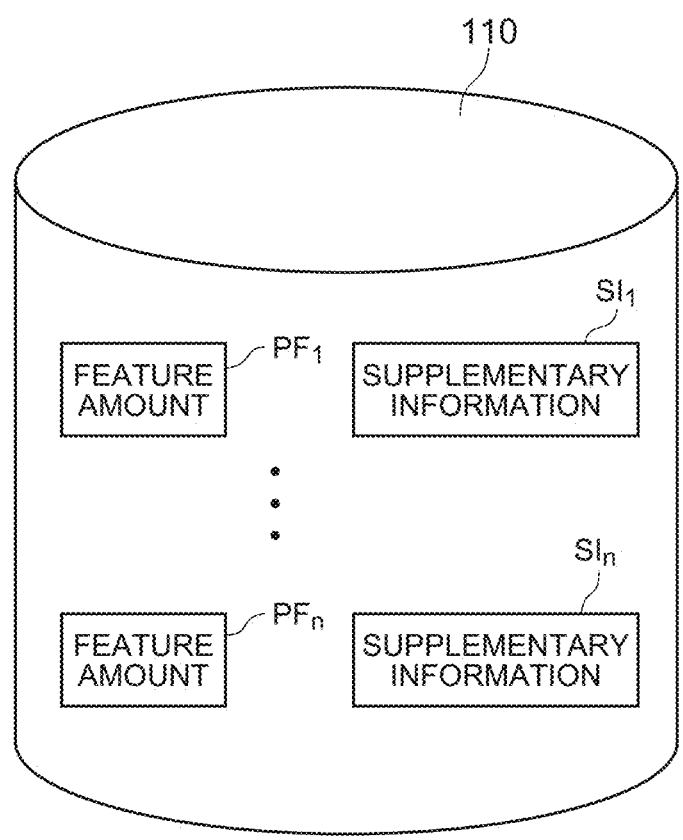
FIG. 14 is a diagram illustrating exemplary contents of a feature amount storing means in the individual identifying device according to the first exemplary embodiment of the present invention.

FIG. 14 illustrates exemplary contents of the feature amount storing means 110. The feature amounts $PF_1, \ldots, PF_n$ and supplementary information $SI_1, \ldots, SI_n$ are feature amounts and supplementary information corresponding one-to-one to the individual of a registration target.

[Operation of Individual Identification and Individual Collation]

Next, operation of identifying and collating each object to be managed will be described.

Figure 9:
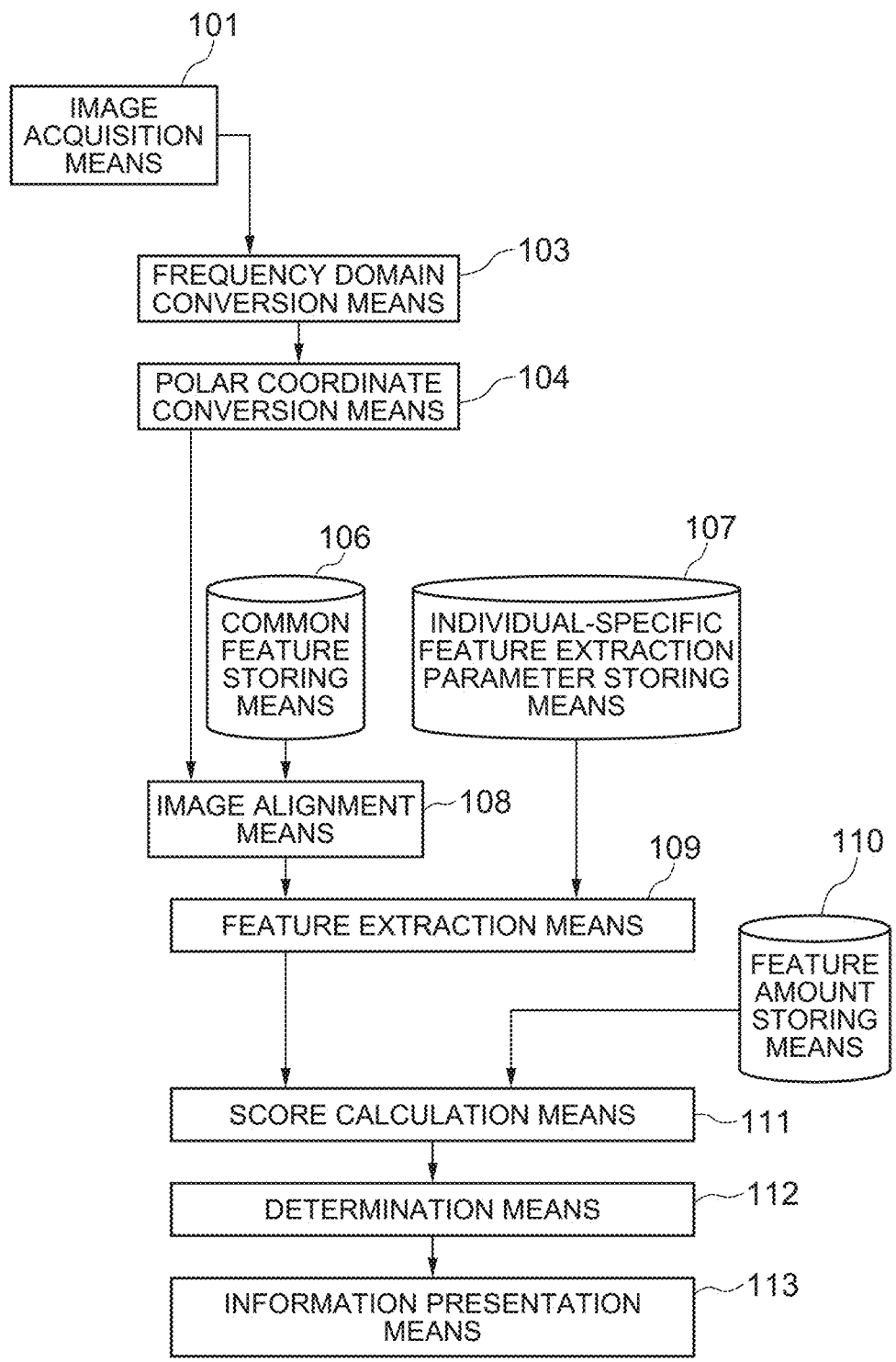
FIG. 9 is a process flow chart of an operation at the time of individual identification and individual collation in the individual identifying device according to the first exemplary embodiment of the present invention.
Figure 10:
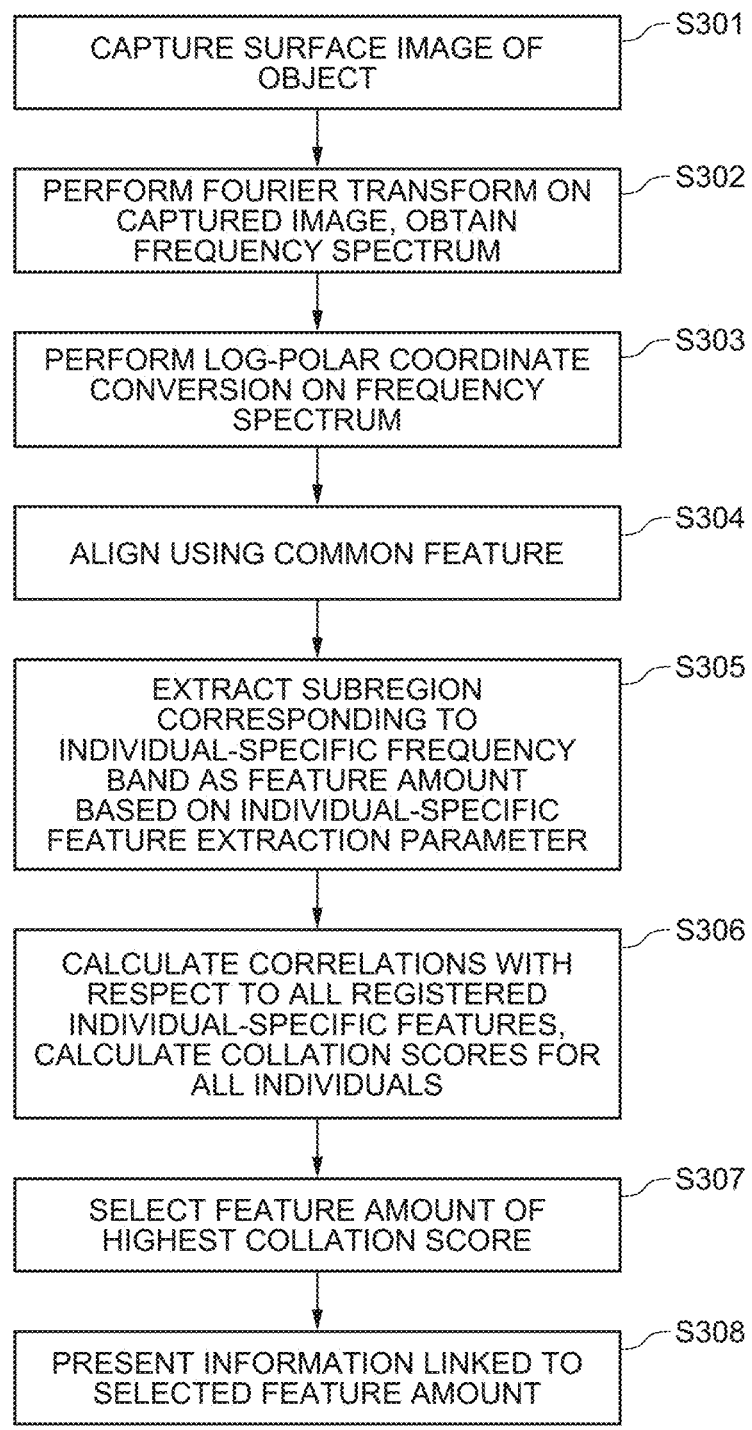
FIG. 10 is a flowchart illustrating an example of an individual identification and individual collation process in the individual identifying device according to the first exemplary embodiment of the present invention.

FIGS. 9 and 10 are a process flow and a flowchart of the operation for individual identification and individual collation. First, the image acquisition means 101 acquires an image obtained by imaging the surface of an object that is a target of identification and collation (step S301). Next, the frequency domain conversion means 103 performs frequency conversion on the captured image acquired by the image acquisition means 101 to generate a frequency spectrum image (step S302). Next, the polar coordinate conversion means 104 performs log-polar coordinate conversion on the frequency spectrum image generated by the frequency domain conversion means 103 (step S303). The processes of steps S301 to S303 are the same as the processes of steps S201 to S203 of FIG. 8 in the operation of individual registration.

Next, the image alignment means 108 receives the frequency spectrum image (after the polar coordinate conversion) of the captured image of the object, that is a target of identification and collation, obtained by the polar coordinate conversion means 104, and the common feature stored in the common feature storing means 106 (frequency spectral component common to a plurality of products), and corrects the positional deviation amount of the frequency spectral image (after the polar coordinate conversion) to the common feature (step S304). When the common features for the respective production lines are stored in the common feature storing means 106 as illustrated in FIG. 13B, the image alignment means 108 uses all of the common features. In other words, the image alignment means 108 corrects the positional deviation amount of the frequency spectrum image (after the polar coordinate conversion) with respect to the common feature $CF_1$ to generate a frequency spectrum image after the alignment (after the polar coordinate conversion) (hereinafter, referred to as a frequency spectrum image after first alignment). Further, the image alignment means 108 corrects the positional deviation amount of the frequency spectrum image (after the polar coordinate conversion) with respect to the common feature $CF_2$ to generate a frequency spectrum image after the alignment (after the polar coordinate conversion) (hereinafter, referred to as a frequency spectrum image after second alignment). The method of correcting the positional deviation amount is the same as the process of step S204 of FIG. 8 in the operation of individual registration.

Next, the feature extraction means 109 receives the frequency spectral image after the alignment obtained by the image alignment means 108, and the parameter stored in the individual-specific feature extraction parameter storing means 107. When the individual-specific feature extraction parameters for the respective production lines are stored in the individual-specific feature extraction parameter storing means 107 as illustrated in FIG. 13B, the feature extraction means 109 uses all of the individual-specific feature extraction parameters. That is, when the frequency spectrum image after the alignment is one that is aligned with use of the common feature $CF_1$, the feature extraction means 109 uses the individual-specific feature extraction parameter $PFP_1$ paired with the common feature $CF_1$. Meanwhile, when the frequency spectrum image after the alignment is one that is aligned with use of the common feature $CF_2$, the feature extraction means 109 uses the individual-specific feature extraction parameter $PFP_2$ paired with the common features $CF_2$.

Next, based on the frequency band information indicated by the input individual-specific feature extraction parameter, the feature extraction means 109 cuts out a partial image from the frequency spectral image after the alignment, and outputs the cut image as the individual-specific feature amount (step S305). When there are a plurality of frequency spectrum images after the alignment, the feature extraction means 109 extracts an individual-specific feature amount from each of them. For example, based on the frequency band information indicated by the individual-specific feature extraction parameter $PFP_1$, the feature extraction means 109 extracts an individual-specific feature amount from the frequency spectrum image after the first alignment (hereinafter referred to as a first individual-specific feature amount). Further, based on the frequency band information indicated by the individual-specific feature extraction parameter $PFP_2$, the feature extraction means 109 extracts an individual-specific feature amount from the frequency spectrum image after the second alignment (hereinafter referred to as a second individual-specific feature amount). In the case where the individual-specific feature extraction parameter includes a weighting factor for each frequency, the feature extraction means 109 multiplies each frequency component by the weighting factor, and then outputs the resultant as an individual-specific feature amount. Similar to the case of individual registration, the individual-specific feature amount is not necessarily a real value of frequency spectrum, and may be a numerical sequence representing the real value of the frequency spectrum as binary data of 0 and 1. Further, it is also possible to use a means for converting it to a binary feature amount represented by Binary Hashing to thereby use a binary code generated from a feature vector of other real values as an individual-specific feature amount.

Next, the score calculation means 111 compares the individual-specific feature amount of the product that is a target of identification and collation obtained by the feature extraction means 109, with all of the feature amounts stored in the feature amount storing means 110, and calculates a score representing the similarity between the feature amounts as a numerical value (step S306). When there are a plurality of individual-specific feature amounts that are targets of identification and collation, the score calculation means 111 compares each of the individual-specific feature amounts with all of the feature amount stored in the feature amount storing means 110 to calculate the scores. For example, the score calculation means 111 compares the first individual-specific feature amount with the feature amounts $PF_1, \ldots, PF_n$ of FIG. 14 stored in the feature amount storing means 110, and calculates n pieces of scores. Further, the score calculation means 111 compares the second individual-specific feature amount with the feature amounts $PF_1, \ldots, PF_n$ of FIG. 14 stored in the feature amount storing means 110, and calculates n pieces of scores.

The score calculation means 111 calculates a score between feature amounts by determining the normalized cross-correlation or phase-only correlation between two feature amounts, fore example. Alternatively, the score calculation means 111 may calculate Hamming distance or Euclidean distance between two feature amounts as a score. The score calculation means 111 may also perform any linear conversion on the value of the correlation or the distance to normalize the score such that the score falls within a range of a certain value.

Then, based on the score calculated by the score calculation means 111, the determination means 112 determines the feature amount stored in the feature amount storing means 110 that matches the captured image of the product that is a target of identification and collation. For example, the determination means 112 sorts the scores between the feature amount obtained from the captured image of the product that is a target of identification and collation and all of the feature amounts stored in the feature amount storing means 119, and selects the feature amount in which the score becomes maximum (normalized cross-correlation becomes maximum) (step S307). Then, the determination means 112 reads the supplementary information linked to the selected feature amount from the feature amount storing means 110, and outputs is as product information of the product that is a target of identification and collation.

The determination means 112 may also determine whether or not the score between the feature amount obtained from the captured image of the product that is a target of identification and collation and all of the feature amounts stored in the feature amount storing means 119 exceeds a preset threshold. Then, if none of the scores between the feature amount obtained from the captured image of the product that is a target of identification and collation and all of the feature amounts stored in the feature amount storing means 119 exceed the threshold, the determination means 112 determines that the product that is a target of identification and collation is not registered, and outputs information representing an authentication error. The determination means 112 that operates as described above can be used for individual authentication purpose such as authenticity determination of a management target.

Then, when the information presentation means 113 receives product information or authentication error information from the determination means 112, the information presentation means 113 displays product information and individual authentication information that are individual identification results of the product that is a target of identification and collation, on the display device not shown, or outputs them to an external terminal (step S308).

Effect of Present Embodiment

According to the present embodiment, it is possible to accurately align the image obtained by imaging an object. This is because the image registration means 108 performs alignment based on a subregion (in the present embodiment, a frequency spectral component common to a plurality of products) in the image to be aligned (in the present embodiment, a frequency spectrum image after polar coordinate conversion).

Further, according to the present embodiment, individual management of parts and products that are mass-produced in a production line can be realized through introduction of a low-cost additional device to the existing production line. This is because as an image can be precisely aligned as described above, there is no need to use a transport system for accurate positioning, a mechanism for imaging the same portion by pressing an imaging mechanism to the object surface, application of a mark for positioning, application of taggant particles, identification and collation processes to be performed the number of times in proportion to the number of registrations, and the like.

Second Exemplary Embodiment

Figure 15:
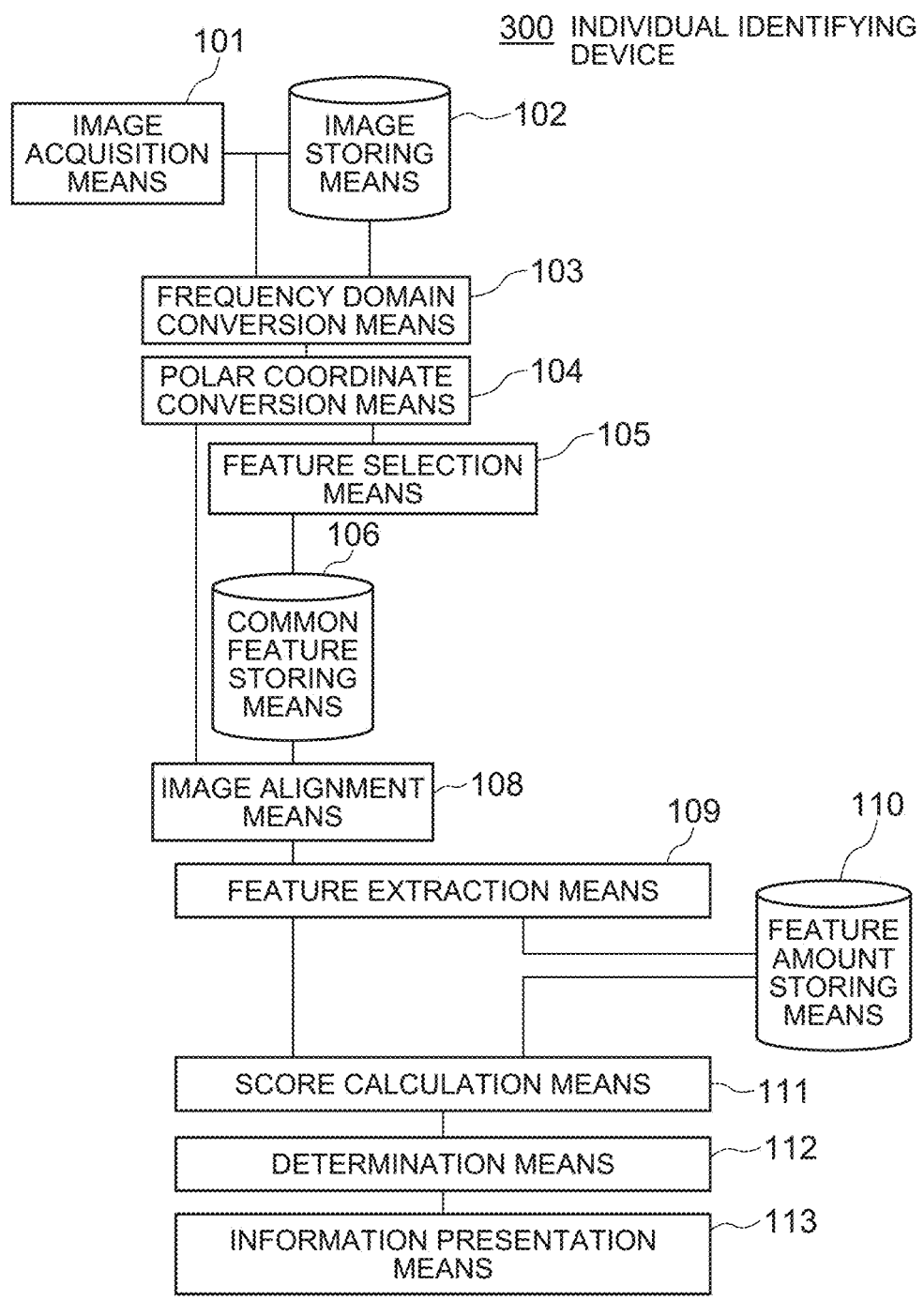
FIG. 15 is a block diagram of an individual identifying device according to a second exemplary embodiment of the present invention.

FIG. 15 is a block diagram of an individual identifying device according to the present embodiment. An individual identifying device 300 according to the present embodiment differs from the individual identifying device 100 illustrated in FIG. 1 in that the individual-specific feature extraction parameter storing means 107 is omitted, and that the functions of the feature selection means 105 and the feature extraction means 109 are different. The other configurations are the same.

The feature selection means 105 of the individual identifying device 300 differs from the feature selection means 105 of the individual identifying device 100 illustrated in FIG. 1 in that the function of calculating an individual-specific feature extraction parameter is omitted. The other configurations are the same.

The feature extraction means 109 of the individual identifying device 300 differs from the feature extraction means 109 of the individual identifying device 100 in that the individual-specific feature amount is extracted from a preset band in an image after alignment (frequency spectrum image after polar coordinate conversion). The other configurations are the same. If the preset band is set to include a band other than the frequency spectrum region common to a plurality of products stored in the common frequency storage means 109, the preset band may include a frequency spectrum region common to a plurality of products.

In the individual identifying device 300 according to the present embodiment, the identification and collation accuracy is lowered compared with that of the individual identifying device 100 illustrated in FIG. 1, because the feature amount extracted from an individual image by the feature extraction means 109 may also include a feature amount common to a plurality of individuals, in addition to the individual-specific feature amount. However, the individual identifying device 300 has an advantage that the configuration and the operation are simplified.

Third Exemplary Embodiment

Figure 16:
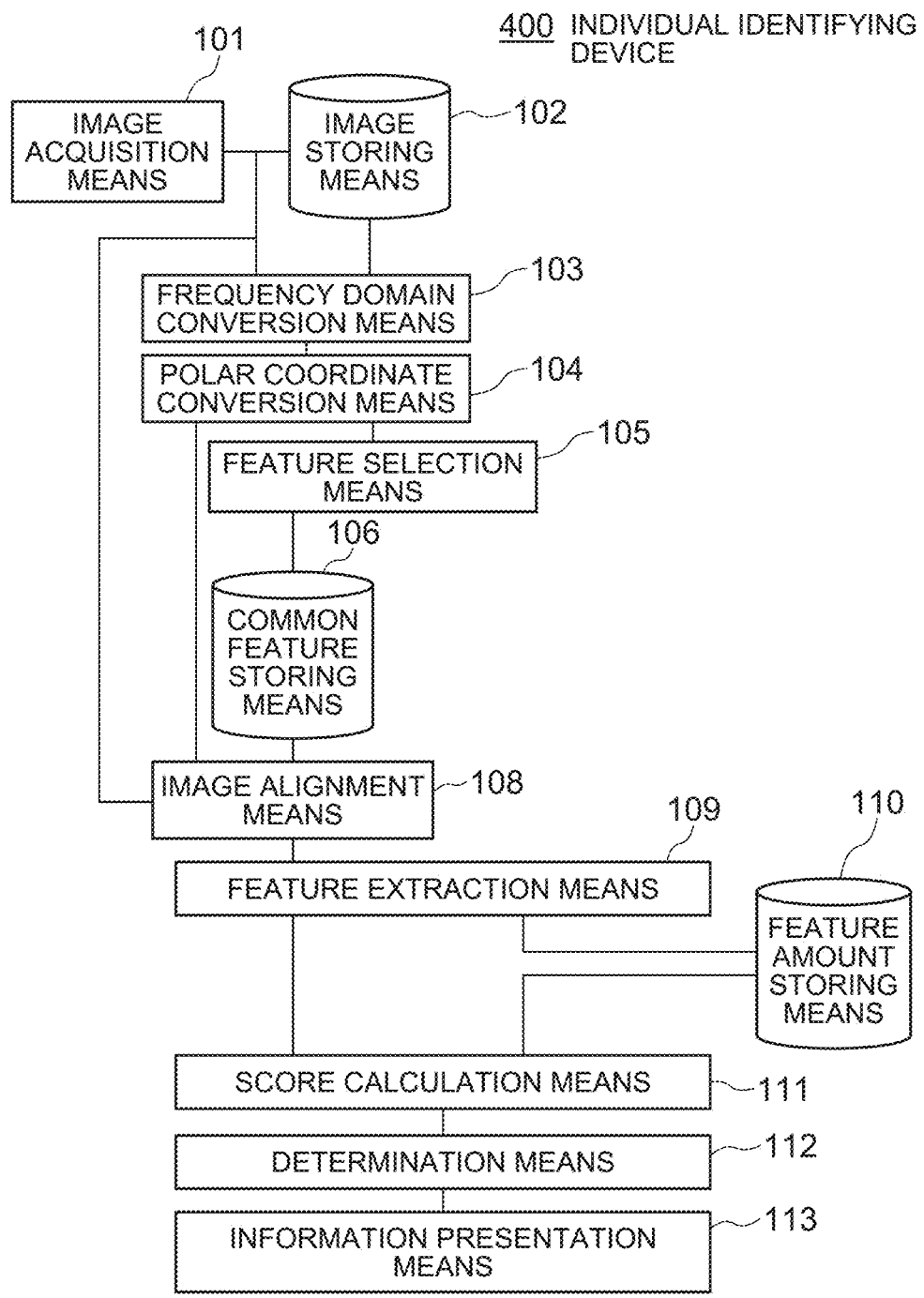
FIG. 16 is a block diagram of an individual identifying device according to a third exemplary embodiment of the present invention.

FIG. 16 is a block diagram of an individual identifying device according to the present embodiment. An individual identifying device 400 according to the present embodiment differs from the individual identifying device 300 illustrated in FIG. 15 in that the functions of the image alignment means 108 and the feature extraction means 109 are different. The other configurations are the same.

The image alignment means 108 of the individual identifying device 400 receives a frequency spectrum image (after polar coordinate conversion) of a captured image of an object obtained by the polar coordinate conversion means 104, and a common feature (that is, a frequency spectral component common to a plurality of products) stored in the common feature storing means 106, and calculates the positional deviation amount of the frequency spectral image (after polar coordinate conversion) with respect to the common feature. Then, based on the calculated positional deviation amount, the image alignment means 108 calculates a correction amount that represents magnification information (enlargement/reduction ratio) and rotational angle information of the captured image of the object. This utilizes the fact that rotational movement in the real coordinates becomes lateral movement along the θ axis in the polar coordinates, and scale variation in the actual coordinates becomes lateral movement along the log-r axis in the log-polar coordinates. Then, the image alignment means 108 corrects the captured image acquired by the image acquisition means 101, in accordance with the calculated correction amount. Specifically, the image alignment means 108 performs an enlargement/reduction process on the captured image in accordance with magnification information included in the correction amount, and performs a rotation process on the captured image in accordance with the rotational angle information included in the correction amount.

The feature extraction means 109 of the individual identifying device 400 extracts an individual-specific feature amount from the captured image after the alignment obtained by the image alignment means 108. The individual-specific feature amount is not necessarily an illuminance value of the captured image, and may be a numerical sequence representing the illuminance value of the captured image as binary data of 0 and 1. For example, the feature extraction means 109 selects a pixel pair at a predetermined position from the captured image after the alignment, allocates values of 0 and 1 according to the magnitude relation thereof, and uses the binary code as the feature amount. Further, the feature extraction means 109 may use a means for conversion into a binary feature amount represented by Binary Hashing to thereby use a binary code generated from a feature vector of other real values as a feature amount.

The individual identifying device 400 according to the present embodiment needs an alignment process in the spatial region of the original captured image, compared with the individual identifying device 100 illustrated in FIG. 1. However, it is possible to directly extract a feature amount from the original captured image.

Fourth Exemplary Embodiment

Figure 17:
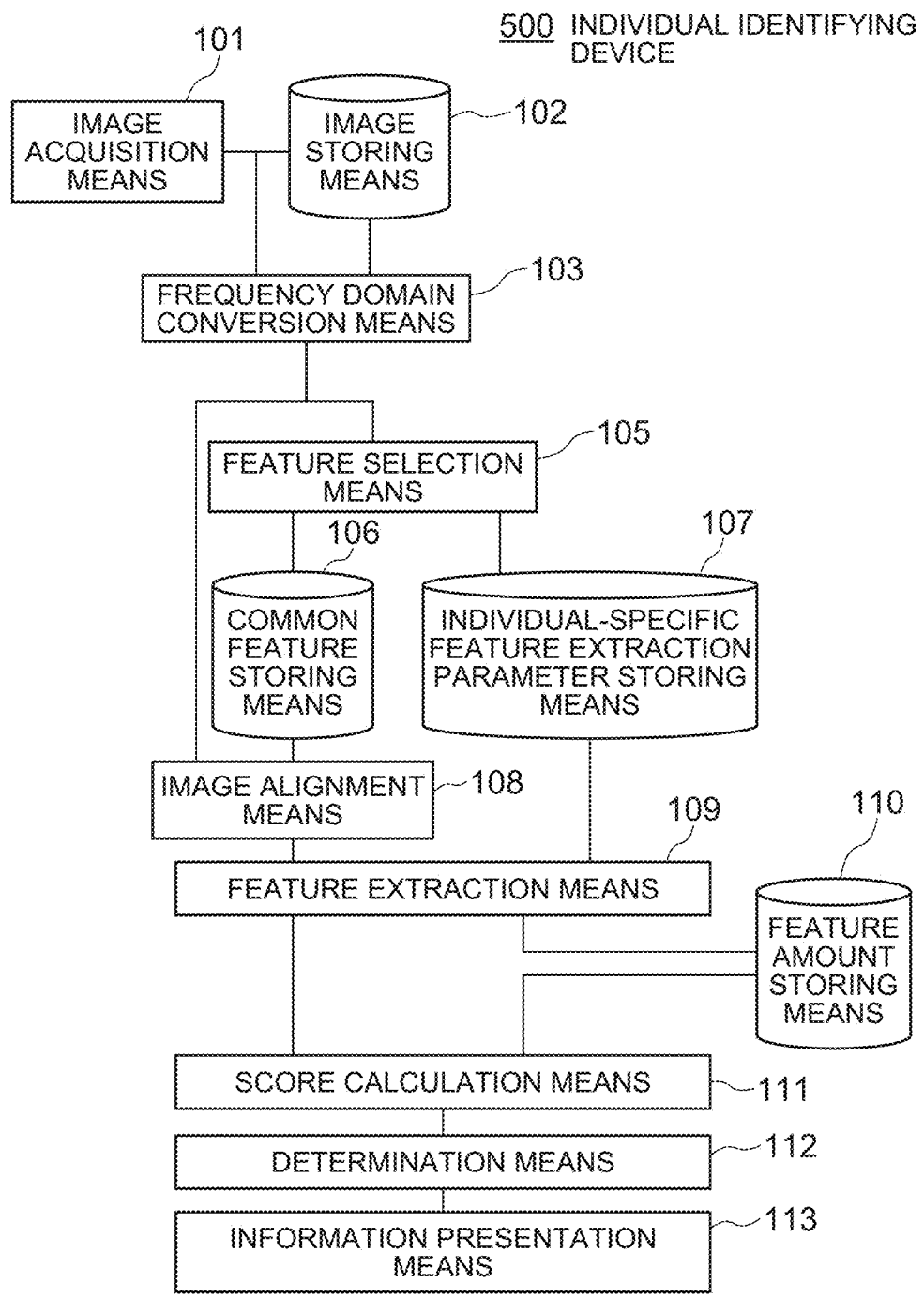
FIG. 17 is a block diagram of an individual identifying device according to a fourth exemplary embodiment of the present invention.

FIG. 17 is a block diagram of an individual identifying device according to the present embodiment. An individual identifying device 500 according to the present embodiment differs from the individual identifying device 100 illustrated in FIG. 1 in that the polar coordinate conversion means 104 is omitted, and that the functions of the feature selection means 105 and the image alignment means 108 are different. The other configurations are the same.

The feature selection means 105 of the individual identifying device 500 differs from the feature selection means 105 of the individual identifying device 100 illustrated in FIG. 1 in that a frequency spectrum component common to a plurality of products (common feature) and an individual-specific feature extraction parameter are calculated from the frequency spectrum image (without polar coordinate conversion) of an object generated by the frequency domain conversion means 103. The other configurations are the same.

The image alignment means 108 of the individual identifying device 500 receives a frequency spectrum image (without polar coordinate conversion) of a captured image of an object obtained by the frequency domain conversion means 103, and a common feature (frequency spectral component common to a plurality of products) stored in the common feature storing means 106, and corrects the positional deviation amount of the frequency spectral image (without polar coordinate conversion) with respect to the common feature. For example, the image alignment means 108 obtains a phase-only correlation between the frequency spectrum image (without polar coordinate conversion) and the common feature, and calculates the positional deviation amount from the correlation peak position. Then, the image alignment means 108 corrects the frequency spectrum image (without polar coordinate conversion) of the captured image of the object, according to the calculated positional displacement amount. Note that the image alignment process described above is only an example. It is needless to say that the process can be replaced with a general-purpose alignment process such as minimization of the sum of difference square between two images or alignment based on a normalized cross-correlation.

The individual identifying device 500 according to the present embodiment has an advantage that the configuration and the operation are simplified because no conversion process to polar coordinates or log polar coordinates is involved, compared with the individual identifying device 100 illustrated in FIG. 1. The present embodiment is effective when there is no scale variation at the time of image acquisition and there is rotational variation between captured images.

Fifth Exemplary Embodiment

Figure 18:
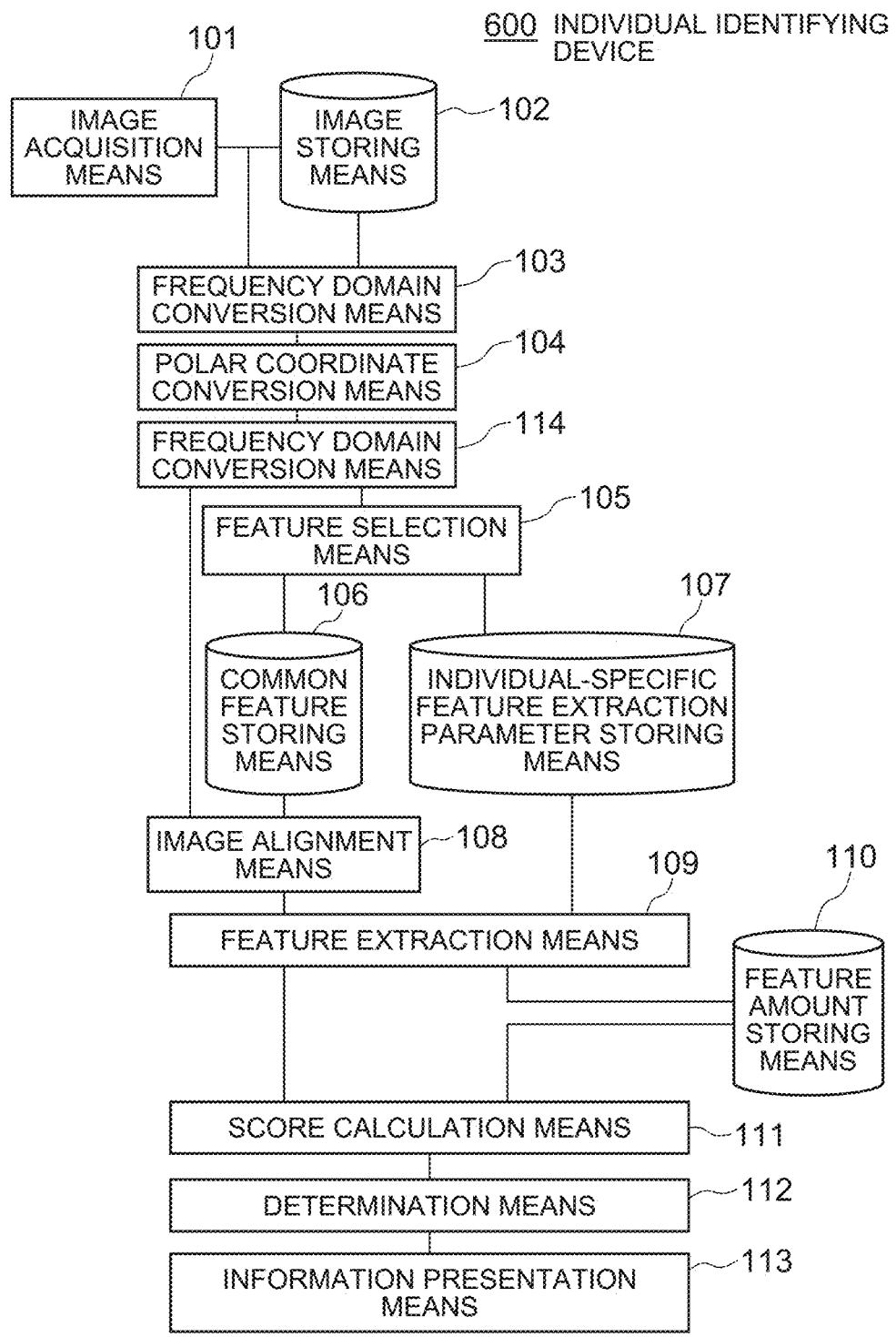
FIG. 18 is a block diagram of an individual identifying device according to a fifth exemplary embodiment of the present invention.

FIG. 18 is a block diagram of an individual identifying device according to the present embodiment. An individual identifying device 600 according to the present embodiment differs from the individual identifying device 100 illustrated in FIG. 1 in that a frequency domain conversion means 114 is additionally provided, and the functions of the feature selection means 105, the image alignment means 108, and the feature extraction means 109 are different. The other configurations are the same.

A function of further performing frequency conversion such as two-dimensional discrete Fourier transform, on the frequency spectrum image after polar coordinate conversion generated by the polar coordinate conversion means 104, is additionally provided. An image that is a conversion result by the polar coordinate conversion means 104 is output to the feature selection means 105 and the image alignment means 108.

The feature selection means 105 of the individual identifying device 600 differs from the feature selection means 105 of FIG. 1 in that a frequency spectrum component common to a plurality of products to be managed (common feature) and an individual-specific feature extraction parameter are calculated from an image that is obtained by further performing frequency conversion on the frequency spectrum image after the polar coordinate conversion obtained by the frequency domain conversion means 114.

The image alignment means 108 of the individual identifying device 600 differs from the image alignment means 108 illustrated in FIG. 1 in that it performs alignment of an image obtained by further performing frequency conversion on the frequency spectrum image after the polar coordinate conversion, corresponding to the capture image of the product surface to be managed, with respect to the common feature stored in the common feature storing means 106.

The feature extraction means 109 of the individual identifying device 600 differs from the feature extraction means 109 of the individual identifying device 100 in that an individual-specific feature amount is extracted from an image after the alignment (an image obtained by further performing frequency conversion on the frequency spectrum image after the polar coordinate conversion). The other configurations are the same.

Sixth Exemplary Embodiment

Figure 19:
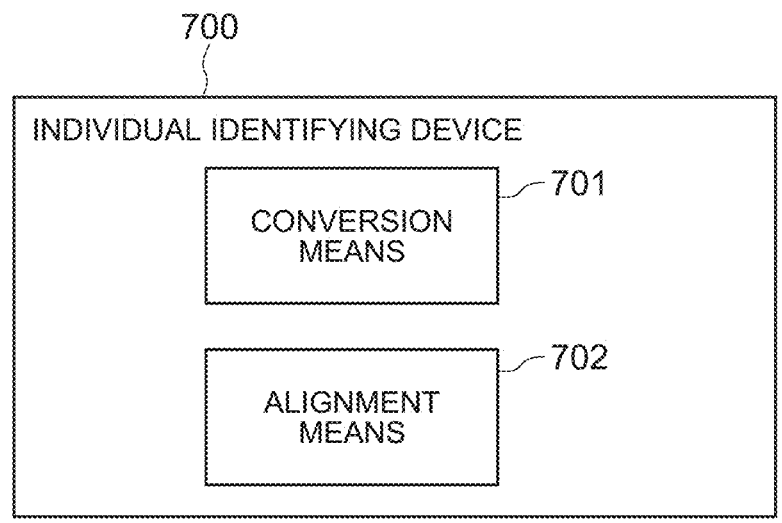
FIG. 19 is a block diagram of an individual identifying device according to a sixth exemplary embodiment of the present invention.

FIG. 19 is a block diagram of an individual identifying device according to the present embodiment. An individual identifying device 700 according to the present embodiment includes a conversion means 701 and an alignment means 702.

The conversion means 701 has a function of performing frequency conversion on an image obtained by capturing an object. The conversion means 701 can be implemented by the frequency domain conversion means 103 of FIG. 1, for example, but is not limited thereto.

The alignment means 702 has a function of aligning an image for extracting a feature amount for identifying an individual of an object, based on a first subregion in the image after the frequency conversion by converter 701. The alignment means 702 is may be implemented by the image alignment means 108 of FIG. 1, the image alignment means 108 of FIG. 15, the image alignment means 108 of FIG. 16, or the image alignment means 108 of FIG. 17, for example, but is not limited thereto.

The Individual identifying device 700 configured as described above operates as described below. That is, first, the conversion means 701 performs frequency conversion on an image obtained by capturing an object. Next, the alignment means 702 performs alignment of the image for extracting a feature amount for identifying the individual of the object, based on a first subregion in the image after the frequency conversion performed by the conversion means 701.

As described above, according to the present embodiment, it is possible to accurately align an image. This is because the conversion means 701 performs frequency conversion on an image obtained by capturing an object, and the alignment means 702 performs alignment of the image for extracting a feature amount for identifying the individual of the object, based on a first subregion in the image after the frequency conversion.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to a field of performing individual identification and management of respective products by acquiring spontaneous fine differences in patterns arising in the same manufacturing process such as fine unevenness and a pattern on the product surface, or a random pattern or the like on the material surface, as an image with use of an imaging device such as a camera, and recognizing the fine patterns.

The whole or part of the exemplary embodiments disclosed above can be described as, but not limited to, the following supplementary notes.

Supplementary Note 1

An individual identifying device comprising:
a conversion unit that performs frequency conversion on an image obtained by imaging an object: and
an alignment unit that performs alignment of an image for extracting a feature amount for identifying an individual of the object, based on a first subregion in an image after the frequency conversion.

Supplementary Note 2

The individual identifying device according to supplementary note 1, wherein
the first subregion is a subregion in an image obtained such that the image after the frequency conversion is applied with polar coordinate conversion or log-polar coordinate conversion.

Supplementary Note 3

The individual identifying device according to supplementary note 1, wherein
the first subregion is a subregion in an image obtained such that the image after the frequency conversion is applied with polar coordinate conversion or log-polar coordinate conversion, and then further applied with frequency conversion.

Supplementary Note 4

The individual identifying device according to any of supplementary notes 1 to 3, wherein
the first subregion is a region showing an individual common feature.

Supplementary Note 5

The individual identifying device according to any of supplementary notes 1 to 4, wherein
the image on which alignment is performed for extracting the feature amount is the image after the frequency conversion.

Supplementary Note 6

The individual identifying device according to any of supplementary notes 1 to 5, wherein
the alignment unit calculates, based on a result of comparing a reference image of the first subregion with the image before the alignment, a positional deviation amount between the reference image and the image before the alignment, and corrects positional deviation of the image before the alignment based on the positional deviation amount in order to generate the image after the alignment.

Supplementary Note 7

The individual identifying device according to supplementary note 6, further comprising a reference image determination unit that extracts a subregion showing a common feature as the reference image, from a plurality of images obtained such that a plurality of images obtained by imaging a plurality of objects are applied with frequency conversion.

Supplementary Note 8

The individual identifying device according to any of supplementary notes 1 to 5, wherein
the alignment unit calculates, based on a result of comparing a plurality of reference images of the first subregion with the image before the alignment, a plurality of positional deviation amounts between the plurality of the reference images and the image before the alignment, and corrects positional deviation of the plurality of the images before the alignment based on the plurality of the positional deviation amounts in order to generate a plurality of images after the alignment.

Supplementary Note 9

The individual identifying device according to supplementary note 8, further comprising
a reference image determination unit that, from a plurality of images obtained such that a plurality of images obtained by imaging a plurality of objects manufactured in a production line are applied with frequency conversion, extracts a subregion showing a common feature as the reference image corresponding one-to-one to the production line.

Supplementary Note 10

The individual identifying device according to any of supplementary notes 1 to 9, further comprising
a feature extraction unit that extracts the feature amount from the image after the alignment.

Supplementary Note 11

The individual identifying device according to supplementary note 10, wherein
the feature extraction unit extracts the feature amount from a second subregion in the image after the alignment.

Supplementary Note 12

The individual identifying device according to supplementary note 11, wherein
the second subregion is a region showing an individual-specific feature.

Supplementary Note 13

The individual identifying device according to supplementary note 11 or 12, wherein
the first subregion and the second subregion have frequency bands different from each other.

Supplementary Note 14

The individual identifying device according to any of supplementary notes 11 to 13, wherein
the second subregion is a frequency band in which a weighting factor is applied to frequency spectrum.

Supplementary Note 15

The individual identifying device according to any of supplementary notes 11 to 14, further comprising a second subregion determination unit that extracts, as the second subregion, a subregion other than a subregion showing a feature common to a plurality of images obtained such that a plurality of images obtained by imaging a plurality of objects are applied with frequency conversion.

Supplementary Note 16

The individual identifying device according to any of supplementary notes 11 to 14, further comprising
a second subregion determination unit that extracts, from a plurality of images obtained such that a plurality of images obtained by imaging a plurality of objects manufactured in a production line are applied with frequency conversion, a subregion other than a subregion showing a common feature as the second subregion corresponding one-to-one to the production line.

Supplementary Note 17

The individual identifying device according to any of supplementary notes 1 to 4, wherein
the image on which the alignment is performed is the image before the frequency conversion.

Supplementary Note 18

The individual identifying device according to any of supplementary notes 10 to 17, further comprising
a storage unit that stores the extracted feature amount in association with an identification number of the object.

Supplementary Note 19

The individual identifying device according to any of supplementary notes 10 to 18, further comprising
a collation unit that collates the extracted feature amount with a feature amount of an object registered in advance.

Supplementary Note 20

An individual identifying method comprising:
performing frequency conversion on an image obtained by imaging an object; and
based on a first subregion in an image after the frequency conversion, performing alignment of the image for extracting a feature amount for identifying an individual of the object.

Supplementary Note 21

The individual identifying method according to supplementary note 20, wherein
the first subregion is a subregion in an image obtained such that the image after the frequency conversion is applied with polar coordinate conversion or log-polar coordinate conversion.

Supplementary Note 22

The individual identifying method according to supplementary note 20, wherein
the first subregion is a subregion in an image obtained such that the image after the frequency conversion is applied with polar coordinate conversion or log-polar coordinate conversion, and then further applied with frequency conversion.

Supplementary Note 23

The individual identifying method according to any of supplementary notes 20 to 22, wherein
the first subregion is a region showing an individual common feature.

Supplementary Note 24

The individual identifying method according to any of supplementary notes 20 to 23, wherein
the image on which alignment is performed for extracting the feature amount is the image after the frequency conversion.

Supplementary Note 25

The individual identifying method according to any of supplementary notes 20 to 24, wherein
the alignment includes calculating, based on a result of comparing a reference image of the first subregion with the image before the alignment, a positional deviation amount between the reference image and the image before the alignment, and correcting positional deviation of the image before the alignment based on the positional deviation amount in order to generate the image after the alignment.

Supplementary Note 26

The individual identifying method according to supplementary note 25, further comprising
extracting a subregion showing a common feature as the reference image, from a plurality of images obtained such that a plurality of images obtained by imaging a plurality of objects are applied with frequency conversion.

Supplementary Note 27

The individual identifying method according to any of supplementary notes 20 to 24, wherein
the alignment includes, based on a result of comparing a plurality of reference images of the first subregion with the image before the alignment, calculating a plurality of positional deviation amounts between the plurality of the reference images and the image before the alignment, and correcting positional deviation of the plurality of the images before the alignment based on the plurality of the positional deviation amounts in order to generate a plurality of images after the alignment.

Supplementary Note 28

The individual identifying method according to supplementary note 27, further comprising
from a plurality of images obtained such that a plurality of images obtained by imaging a plurality of objects manufactured in a production line are applied with frequency conversion, extracting a subregion showing a common feature as the reference image corresponding one-to-one to the production line.

Supplementary Note 29

The individual identifying method according to any of supplementary notes 20 to 28, further comprising
extracting the feature amount from the image after the alignment.

Supplementary Note 30

The individual identifying method according to supplementary note 29, wherein
the extracting the feature amount includes extracting the feature amount from a second subregion in the image after the alignment.

Supplementary Note 31

The individual identifying method according to supplementary note 30, wherein
the second subregion is a region showing an individual-specific feature.

Supplementary Note 32

The individual identifying method according to supplementary note 30 or 31, wherein the first subregion and the second subregion have frequency bands different from each other.

Supplementary Note 33

The individual identifying method according to any of supplementary notes 30 to 32, wherein
the second subregion is a frequency band in which a weighting factor is applied to frequency spectrum.

Supplementary Note 34

The individual identifying method according to any of supplementary notes 30 to 33, further comprising
extracting, as the second subregion, a subregion other than a subregion showing a feature common to a plurality of images obtained such that a plurality of images obtained by imaging a plurality of objects are applied with frequency conversion.

Supplementary Note 35

The individual identifying method according to any of supplementary notes 30 to 33, further comprising
extracting, from a plurality of images obtained such that a plurality of images obtained by imaging a plurality of objects manufactured in a production line are applied with frequency conversion, a subregion other than a subregion showing a common feature as the second subregion corresponding one-to-one to the production line.

Supplementary Note 36

The individual identifying method according to any of supplementary notes 30 to 33, wherein
the image on which the alignment is performed is the image before the frequency conversion.

Supplementary Note 37

The individual identifying method according to any of supplementary notes 29 to 36, further comprising
storing the extracted feature amount in association with an identification number of the object.

Supplementary Note 38

The individual identifying method according to any of supplementary notes 29 to 38, further comprising
collating the extracted feature amount with a feature amount of an object registered in advance.

Supplementary Note 39

A program for causing a computer to function as:
a conversion unit that performs frequency conversion on an image obtained by imaging an object; and
an alignment unit that performs alignment of an image for extracting a feature amount for identifying an individual of the object, based on a first subregion in an image after the frequency conversion.

REFERENCE SIGNS LIST 100 individual identifying device
101 image acquisition means
102 image storing means
103 frequency domain conversion means
104 polar coordinate conversion means
105 feature selection means
106 common feature storing means
107 individual-specific feature extraction parameter storing means
108 image alignment means
109 feature extraction means
110 feature amount storing means
111 score calculation means
112 determination means
113 information presentation means
114 frequency domain conversion means
200 information processing device
201 imaging unit
202 operation input unit
203 screen display unit
204 communication interface unit
205 storage unit
206 arithmetic processing unit
207 program
300 individual identifying device
400 individual identifying device
500 individual identifying device
600 individual identifying device
700 individual identifying device
701 conversion means
702 alignment means

The invention claimed is:

1. An individual identifying device comprising:
a memory storing one or more instructions; and
a processor configured to execute the one or more instructions to:
perform frequency conversion on an image obtained by imaging an object; and
perform alignment of an image for extracting a feature amount for identifying an individual of the object, based on a first subregion in an image after the frequency conversion,
wherein the processor is further configured to calculate, based on a result of comparing a reference image of the first subregion with the image before the alignment, a positional deviation amount between the reference image and the image before the alignment, and correct positional deviation of the image before the alignment based on the positional deviation amount in order to generate the image after the alignment.

2. The individual identifying device according to claim 1, wherein
the first subregion is a subregion in an image obtained such that the image after the frequency conversion is applied with polar coordinate conversion or log-polar coordinate conversion.

3. The individual identifying device according to claim 1, wherein
the first subregion is a subregion in an image obtained such that the image after the frequency conversion is applied with polar coordinate conversion or log-polar coordinate conversion, and then further applied with frequency conversion.

4. The individual identifying device according to claim 1, wherein
the first subregion is a region showing an individual common feature.

5. The individual identifying device according to claim 1, wherein
the image on which alignment is performed for extracting the feature amount is the image after the frequency conversion.

6. The individual identifying device according to claim 1, wherein the processor is further configured to extract a subregion showing a common feature as the reference image, from a plurality of images obtained such that a plurality of images obtained by imaging a plurality of objects are applied with frequency conversion.

7. The individual identifying device according to claim 1, wherein the processor is further configured to calculate, based on a result of comparing a plurality of reference images of the first subregion with the image before the alignment, a plurality of positional deviation amounts between the plurality of the reference images and the image before the alignment, and correct the positional deviation of a plurality of the images before the alignment based on the plurality of the positional deviation amounts in order to generate a plurality of images after the alignment.

8. The individual identifying device according to claim 7, wherein the processor is further contoured to extract a subregion from a plurality of images obtained by imaging a plurality of objects manufactured in a production line applied with frequency conversion, showing a common feature as the reference image showing a common feature as the reference image corresponding one-to-one to the production line.

9. The individual identifying device according to claim 1, wherein
the image on which the alignment is performed is the image before the frequency conversion.

10. An individual identifying device comprising:
a memory storing one or more instructions; and
a processor configured to execute the one or more instructions to:
perform frequency conversion on an image obtained by imaging an object; and
perform alignment of an image for extracting a feature amount tor identifying an individual of the object, based on a first subregion in an image after the frequency conversion,
wherein the processor is further configured to extract the feature amount from the image after the alignment, and whereto the processor is further configured to extract the feature amount from a second subregion in the image after the alignment.

11. The individual identifying device according to claim 10, wherein
the second subregion is a region showing an individual-specific feature.

12. The individual identifying device according to claim 10, wherein
the first subregion and the second subregion have frequency bands different from each other.

13. The individual identifying device according to claim 10,
wherein the processor is further configured to extract, from a plurality of images obtained such that a plurality of images obtained by imaging a plurality of objects manufactured in a production line are applied with frequency conversion, a subregion other than a subregion showing a common feature as the second subregion corresponding one-to-one to the production line.

14. The individual identifying device according to claim 10, further comprising
a storage configured to store the extracted feature amount in association with an identification number of the object.

15. The individual identifying device according to claim 10,
wherein the processor is further configured to collate the extracted feature amount with a feature amount of an object registered in advance.

16. An individual identifying method comprising:
performing frequency conversion on an image obtained by imaging an object; and
based on a first subregion in an image after the frequency conversion, performing alignment of the image for extracting a feature amount for identifying an individual of the object,
wherein the performing the alignment of the image comprises:
calculating, based on a result of comparing a reference image of the first subregion with the image before the alignment, a positional deviation amount between the reference image and the image before the alignment, and
correcting positional deviation of the image before the alignment based on the positional deviation amount in order to generate the image after the alignment.

* * * * *